US012649801B2

(12) United States Patent
Luo et al.

(10) Patent No.: US 12,649,801 B2
(45) Date of Patent: Jun. 9, 2026

(54) IN-SITU MAO DERIVED SILICA SUPPORTED SINGLE-SITE METALLOCENE CATALYSTS

(71) Applicant: ExxonMobil Chemical Patents Inc., Baytown, TX (US)

(72) Inventors: Lubin Luo, Houston, TX (US); Francis C. Rix, Houston, TX (US); Kevin A. Stevens, Houston, TX (US); Chi-I Kuo, Atascocita, TX (US); Xiaodan Zhang, Houston, TX (US); Jacqueline A. Lovell, Crosby, TX (US); Charles J. Harlan, Houston, TX (US); Xuan Ye, Houston, TX (US); Brian R. Berg, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 521 days.

(21) Appl. No.: 18/253,867

(22) PCT Filed: Nov. 17, 2021

(86) PCT No.: PCT/US2021/059632
§ 371 (c)(1),
(2) Date: May 22, 2023

(87) PCT Pub. No.: WO2022/108974
PCT Pub. Date: May 27, 2022

(65) Prior Publication Data
US 2024/0092947 A1 Mar. 21, 2024

Related U.S. Application Data

(60) Provisional application No. 63/117,337, filed on Nov. 23, 2020.

(51) Int. Cl.
C08F 4/659 (2006.01)
C08F 10/02 (2006.01)
(Continued)

(52) U.S. Cl.
CPC .......... *C08F 4/65916* (2013.01); *C08F 10/02* (2013.01); *C08F 10/06* (2013.01); *C08F 10/14* (2013.01)

(58) Field of Classification Search
CPC ...... C08F 4/65916; C08F 10/00; C08F 10/02; C08F 10/06; C08F 10/14
See application file for complete search history.

(56) References Cited

U.S. PATENT DOCUMENTS 4,935,397 A 6/1990 Chang
4,937,217 A 6/1990 Chang
(Continued)

FOREIGN PATENT DOCUMENTS

WO 2019089144 A1 5/2019

OTHER PUBLICATIONS

Dong-hee Lee, et al., (1995) "Ethylene Polymerization with Metallocene and Trimethylaluminum Treated Silica", Macromol. Symp 97, pp. 195-203 URL: https://doi.org/10.1002/masy.19950970120.
(Continued)

*Primary Examiner* — Brian A McCaig
(74) *Attorney, Agent, or Firm* — C. Tumey Law Group PLLC

(57) ABSTRACT

The present disclosure relates to supported catalyst systems for olefin polymerization, catalyst system precursors, methods of producing the precursors and catalyst systems and polyolefins formed from the catalyst systems.

7 Claims, 10 Drawing Sheets

(51) Int. Cl.
  *C08F 10/06* (2006.01)
  *C08F 10/14* (2006.01)

(56) References Cited

U.S. PATENT DOCUMENTS

| | | | |
|---|---|---|---|
| 5,006,500 | A | 4/1991 | Chang |
| 7,910,764 | B2 | 3/2011 | Kaji et al. |
| 8,354,485 | B2 | 1/2013 | Luo et al. |
| 8,575,284 | B2 | 11/2013 | Luo et al. |
| 9,090,720 | B2 | 7/2015 | Luo et al. |
| 11,161,922 | B2 * | 11/2021 | Luo ..................... C08F 4/6028 |
| 2016/0355618 | A1 | 12/2016 | Luo et al. |
| 2018/0134731 | A1 | 5/2018 | Bergsma et al. |
| 2019/0127497 | A1 | 5/2019 | Luo et al. |

OTHER PUBLICATIONS

Sinn, et al., (1999) "Formation, Structure, and Mechanism of Oligomeric Methylaluminoxane", in Kaminsky (ed.), Metalorganic Catalysts for Synthesis and Polymerization, Springer-Verlag, pp. 105-122.

* cited by examiner

IN-SITU MAO DERIVED SILICA SUPPORTED SINGLE-SITE METALLOCENE CATALYSTS

CROSS-REFERENCE OF RELATED APPLICATIONS

This application is a National Phase Application claiming priority to PCT Application Serial No. PCT/US2021/059632, filed Nov. 17, 2021, which claims the benefit of and priority to U.S. Provisional Application No. 63/117,337 filed Nov. 23, 2020, and entitled "Improved In-Situ MAO Derived Silica Supported Single-Site Metallocene Catalysts", the disclosures of which is are incorporated herein by reference in their entireties.

FIELD

The present disclosure relates to supported catalyst systems for olefin polymerization, catalyst system precursors, methods of producing the precursors and catalyst systems and polyolefins formed from the catalyst systems.

BACKGROUND

Polyolefins are widely used because of their robust physical properties. For example, various types of polyethylenes, including high density, low density, and linear low density polyethylenes, are some of the most commercially useful. Polyolefins are typically prepared with a catalyst (mixed with one or more other components to form a catalyst system), which promotes polymerization of olefin monomers in a reactor, such as a gas phase reactor.

Methylalumoxane, or MAO, is the most popular activator supported on silica to activate a single site catalyst precursor, e.g., a metallocene, to form an active solid catalyst used in a commercial gas phase reactor to produce single-site polyolefin resins. Commercial MAO is commonly sold as a toluene solution because MAO easily dissolves in toluene. Other solvents have been tried but are not as successful. For example, a donor containing solvents (e.g., an ether or a THF) deactivate MAO. Active proton containing solvents (e.g., an alcohol) react and destroy MAO. Aliphatic solvents (e.g., hexane) have been known to precipitate MAO.

As such, commercially available MAO is typically provided in a toluene solution, which is unstable and requires special handling and cold storage due to the reactive MAO $(Al_4O_3Me_6)_4$ $(TMA)_n$ (n=1,2) (Sinn, et al. (1999) "Formation, Structure, and Mechanism of Oligomeric Methylaluminoxane", in Kaminsky (ed.), *Metalorg. Cat. for Synth. & Polym.*, Springer-Verlag, pp. 105) conversion to more stable unreactive MAO gel $(Al_3O_3Me_3)_x$ (see FIG. 1 for energetic profile). The commercially available MAO has a short life, typically less than one week under ambient conditions and less than twelve months in cold storage because it has a tendency to undergo compositional changes, e.g. gelation, even in cold storage. Commercially available MAO toluene solution is usually stored in a cold environment, e.g., at −20 to −30° C., to reduce gelation. Therefore, the sophisticated procedure/reaction conditions to increase the reactive MAO to inactive gelled MAO ratio in the MAO production process and the cold condition required during the commercial MAO storage/transportation to reduce the MAO gelation process have resulted in very high commercial MAO manufacturing cost. The high cost and the sophisticated handling procedure of MAO solution are believed to be the major bottleneck for the single-site polyolefin market growth.

References of interest include: U.S. Pat. Nos. 4,937,217; 5,006,500; 7,910,764; 8,354,485; 8,575,284; 9,090,720; US Publication No. 2016/0355618; WO 2016/170017; Luo, Jain, and Harlan, *ACS Annual Meeting, Conference Abstracts PMSE* 126 and INOR 1169, Apr. 2-6, 2017; and Sinn, et al. (1999) "Formation, Structure, and Mechanism of Oligomeric Methylaluminoxane", in Kaminsky (ed.), *Metalorg. Cat. for Synth. & Polym.*, Springer-Verlag, pp. 105.

There is a need, therefore, for new catalyst systems capable of delivering a similar performance to a conventional MAO derived catalyst systems including good productivity and good operability while removing the complication of solution MAO production and handling. There is still also a need for low cost methods for forming such catalyst systems as well as for controlling both the catalyst system formation and the polymerization conditions to obtain desired polymer properties.

DETAILED DESCRIPTION

Figure 1:
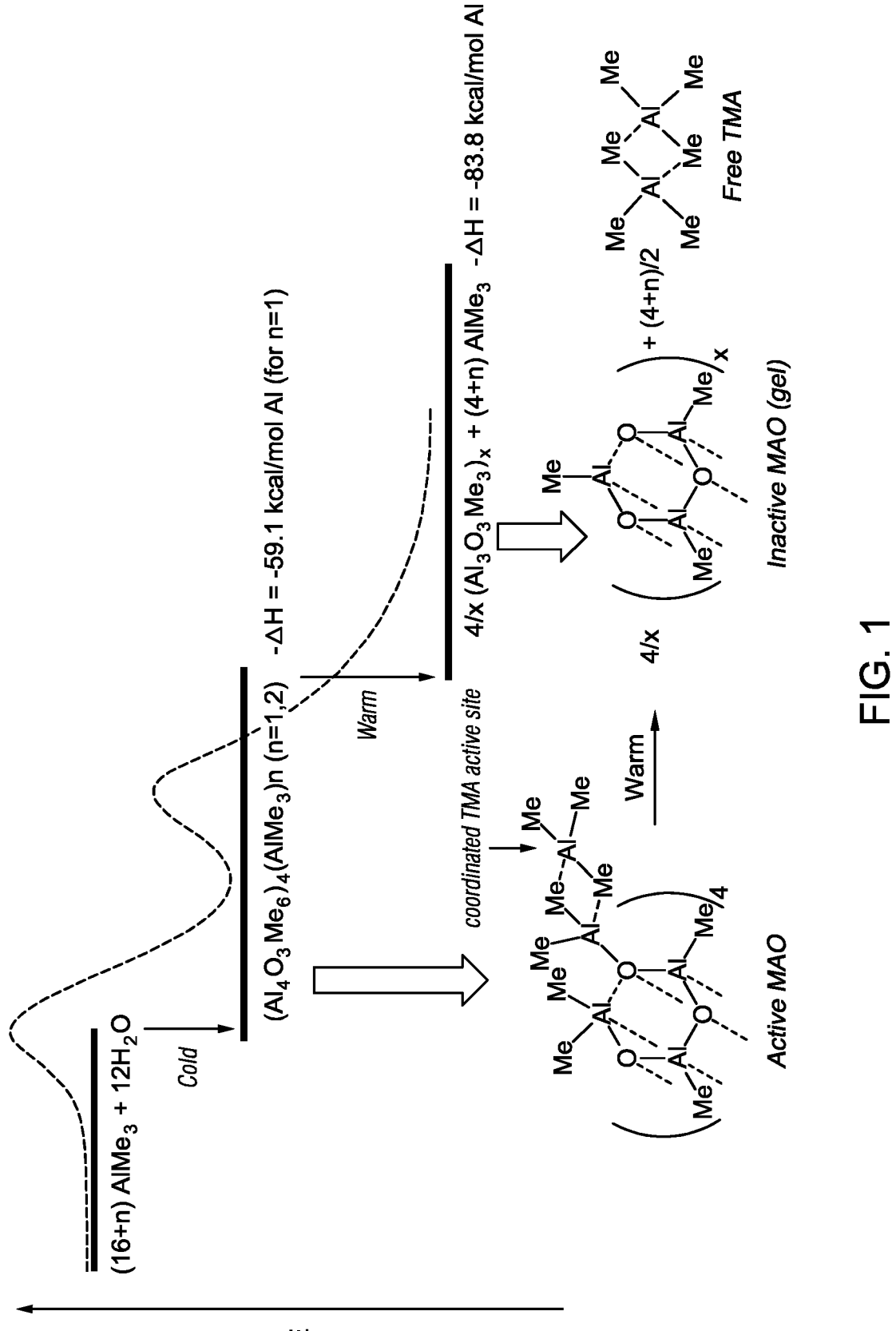
FIG. 1 is a schematic showing an illustrative reactive MAO formation and unreactive MAO gel formation energetic profile.

The present disclosure provides one or more methods for controlling catalyst formation to form better in-situ supported MAO based catalyst systems with improved catalyst activities, polymer bulk densities, catalyst operability in a gas- or slurry-phase polymerization reactor (e.g., the control of fouling and the catalyst solid flowability), polymer properties (e.g., composition distributions (CDs), polymer density, MI, and MIR), as well as the controls of polymerization reactor conditions to obtain targeted polymer properties. One particular method adds wet silica as a viscous slurry or as a solid into a cold TMA solution. Certain viscosity of the wet-silica slurry may be required to prevent silica settlement during the slow slurry addition if the slurry is carried through a long distance to the reactor such as through a tubing, especially with unsmooth diameter changes or sharp turning covers, although the addition through a short distance the higher viscosity may not be needed. A viscous silica slurry can be obtained by either using a heavy hydrocarbon solvent such as Hydrobrite oil to form a viscous slurry that can be added at ambient, or using a light hydrocarbon, such as a $C_5$, $C_6$, or $C_7$ solvent to form a viscous slurry under cooling. A high solid percentage in a light hydrocarbon solvent, e.g., about 25-30% can have a higher viscosity at ambient, the easy evaporation of the low boiling point solvents can cause wet-cake formation locally in the slurry delivery system (e.g., in the slurry pump or tubing turning corners) that may complicate the slurry addition. Details of wet-silica addition methods, including cold silica slurry addition with a low bp solvent; ambient silica slurry addition with a high viscosity solvent; and solid addition are provided herein.

In one particular method, a water loaded support can be formed with a water loading of 3-9 (mmol water/g support) for a support having a surface area in the range of 100-400 $m^2$/g or 5-18 (mmol water/g support) for a support having a surface area in the range of 400-800 $m^2$/g, provided that the at least 60% of the pores in the support have diameters at least 60 angstroms or larger and the total pore volume is in the range of 0.9-3 mL/g. This is the control of MAO loading to avoid overloaded (pores fully filled no space for catalyst to enter and flooded MAO that is a reactor fouling factor) or low loading that hurts that activity; higher surface area silica can take more MAO.

The water loaded silica can be treated in a closed container in a solid or slurry form for at least 10 minutes at 40° C. to 100° C. or in either a closed or an open container for at least 30 minutes at 0° C. to 40° C. This allows the water to evenly distribute within pores to obtain a good MAO distribution that links to operability; poor MAO distribution can cause hollow spots of the form polymer resins that reduces resin bulk density and high water spot derived highly concentrated MAO spots that generates local high heat to reduce polymer Mw.

The water loaded silica can be contacted as a solid or as a slurry with a single or multiple aluminumalkyl solution comprising at least 50 mol % TMA based on total Al that is cooled to a temperature in the range of −5° C. to −60° C., provided that for the water loading of 3-7 mmol/g the temperature is −5° C. or colder and for the water loading higher than 7 mmol/g the temperature is −10° C. or colder and also provided that at least 60% of the supported MAO is formed in an environment of TMA:water ratio at 1:0.75 or higher. More water loading causes more heat release and requires more powerful cooling to maintain low temperature to limit gel formation.

Figure 3:
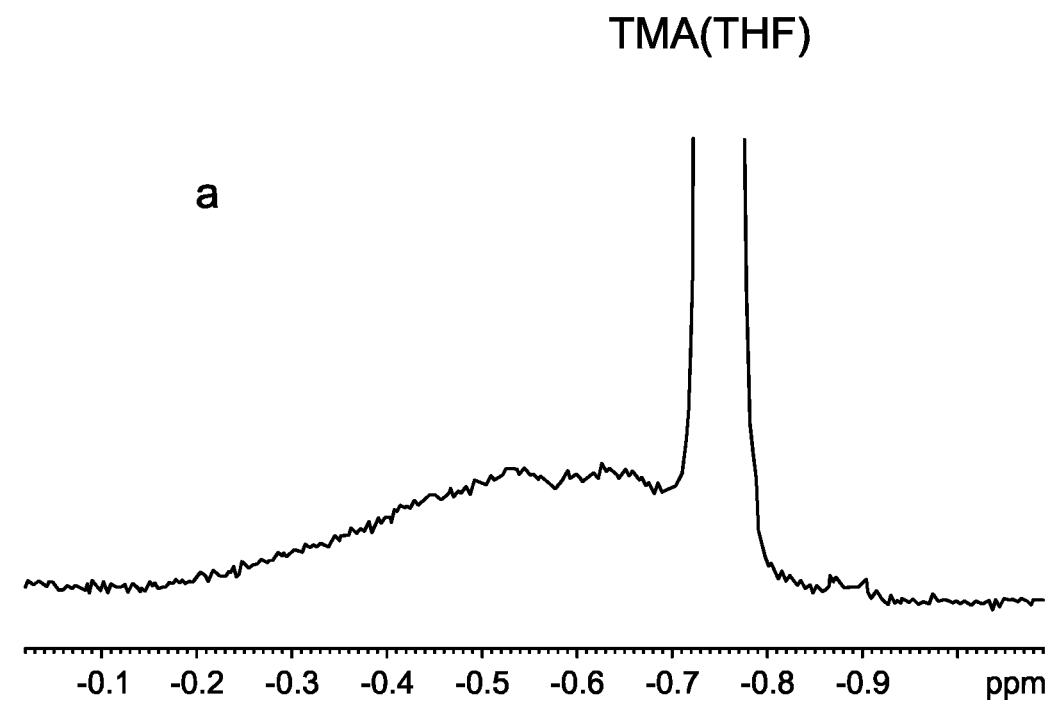
FIG. 3 MAO like broad peak in supernate (a) vs. THF extracted MAO from in-situ sMAO (b), both in THF-d8.
Figure 3:
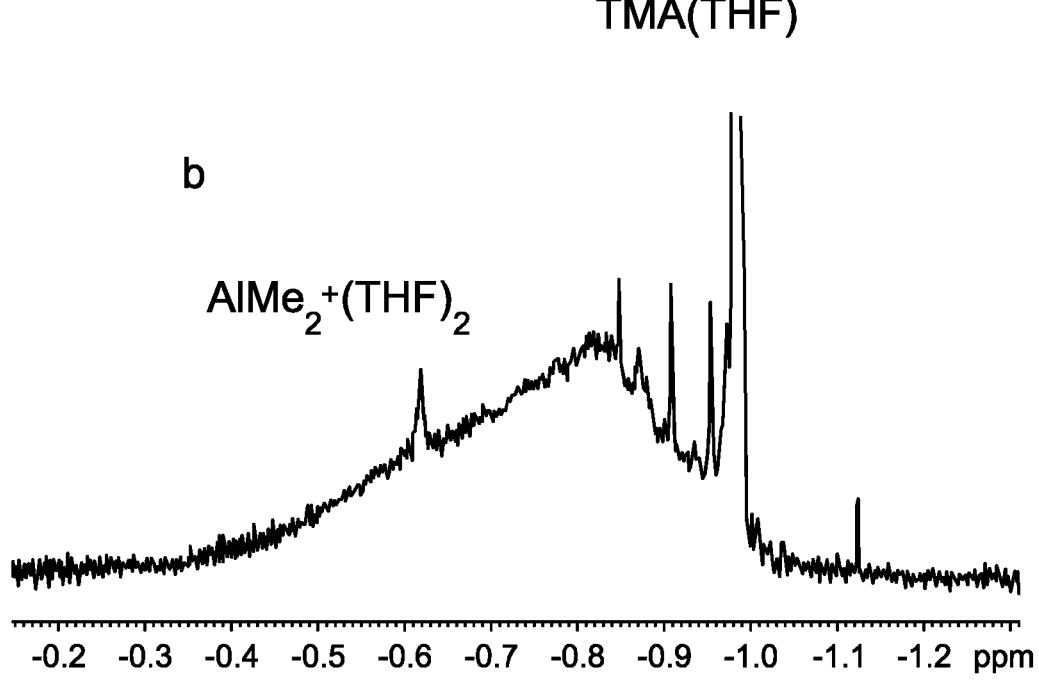

The supported MAO can be heated at 40-130° C. for at least 1 hour or aging at ambient for at least 24 hours. Heating is believed to: 1) convert the unreactive aliphatic solvent soluble small MAO molecules to large, insoluble reactive MAO molecules (as change from FIG. 3 *a* to FIG. 3*b*), which can be achieved by a lower temperature heating, e.g., 40-85° C.; and 2) enhance further MAO dimerization to become bigger MAO molecules, which is more efficiently at a higher temperature, e.g., 85-110° C. that is used for catalyst metal centers with high positive charge, such as catalysts from hafnium metal center with 72 proton in nuclei vs. from zirconium metal center with 40 proton in nuclei, or a catalyst metal center bearing an open ligand framework; both form much tighter ion-pairs, which require a larger MAO anion to reduce the ion-pair interaction to increase activities. Therefore, a higher temperature heating particularly enhances the activity of a hafnocene (e.g., M2) or a bringing zirconocene (structurally open to form tighter ion-pair with MAO, e.g., M3) significantly but not so obviously for non-bridging zirconocenes (structurally close to form weaker ion-pair with MAO, e.g., M1).

FIG. 1 is a schematic showing an illustrative reactive MAO formation and gelation energetic profile. FIG. 1 shows that the active MAO formation heat is mainly contributed from the water reacting with excess TMA. The heat of reaction is therefore better to be expressed as (kcla/mol $H_2O$). The active MAO formation and MAO gelation enthalpy values in FIG. 1 are therefore estimated based on Al—$CH_3$+H—O—H=Al—OH+$CH_4$ with $\Delta H$=−41.88 (kcal/mol OH) from Glaser and Sun, (2011) *J. Am. Chem. Soc.*, v. 133(34), pp. 13323-13336, by assuming applicable to 2 Al—$CH_3$+H—O—H=Al—O—Al+2 $CH_4$ with $\Delta H$=2x−41.88=−83.76 (kcal/mol $H_2O$) for MAO formation without considering the gelation precipitation energy and the methane vaporization energy. For active MAO $(Al_4O_3Me_6)_4$ $(AlMe_3)_n$ with n=1 used for the calculation, because $(Al_4O_3Me_6)_4$ $(AlMe_3)_1$ has a formula of $Al_1O_{0.706}Me_{1.588}$, which is related to 0.706 (mol $H_2O$/mol Al), therefore the active MAO formation enthalpy is −83.76(kcal/mol $H_2O$)x 0.706 (mol $H_2O$/mol Al)=−59.13 (kcal/mol Al). The MAO gel $(Al_3O_3Me_3)$x has a formula $Al_1O_1Me_1$, which has equal Al and O ($H_2O$) units; therefore the formation enthalpy is −83.76 (kcal/mol Al).

Based on the experimental formula of active MAO and the formation conditions, to obtain the MAO structure with at least one coordinated TMA per MAO molecule in the system, at least a 17:12 (1.42:1) of Al:O (TMA:water) ratio and a cold reaction environment are essential. The large heat of reaction of 59 kcal/mol water also requires an efficient heat removal mechanism to maintain the low temperature environment for the active MAO formation and to limit the high local heat that may increase the irreversible gelation reaction that generates the inactive MAO gel. To achieve this, the addition of a water enriched silica in solid or slurry form can be added slowly into a diluted TMA solution cooled to a desired low temperature such that the water molecules always see excess TMA in a cold environment. Because TMA is always in excess, the MAO loading on silica is determined by the amount of water absorbed in the silica pores. The accurate amount of water can be controlled through several approaches, e.g., by removing the unknown amount of moisture originally absorbed on the raw silica through a calcination step and then accurately add back a desired amount of water or by analyzing the water amount on raw silica (such as the LOD method) to determine if more water should be added or removed to obtain the silica with a desired water loading.

Based on the active MAO structure of $(Al_4O_3Me_6)_4$ that requires a stoichiometry of 16 Al:12 O for the MAO molecule with 1-2 coordinated TMA, at least a 17Al:12O (TMA:water) charge can be used to form the $(Al_4O_3Me_6)_4$ $(TMA)_1$ active MAO structure, where the coordinated TMA serves as the active site. This structure requires a cold environment to form more efficiently and become relatively stable. Therefore, TMA addition to water cannot effectively produce the active MAO structure because water is always excess and the reactive TMA will at least lose two methyl groups to form the more stable gel structure due to the rapid, highly exothermic reaction of TMA with water. There will be no TMA available to form the coordinated TMA, the active site. Therefore, adding silica-water slurry to TMA solution is the preferred method to more effectively form the active MAO structure due to water always surrounded by excess TMA molecules to maximize the number of coordinated TMA and therefore to limit the formation of inactive MAO gel (Al:O ratio is about 1:1). For such a reason, the water content on silica therefore determines the MAO loading, i.e., the higher the water content, the higher the MAO loading and the higher the activity of the derived catalyst if the catalyst precursor requires more MAO to become fully activated. However, common silica used in many commercial supported catalyst systems such as Grace 948, 955, PQ ES70, and ES70X all have a surface area slightly less than 300 m²/g, which puts a limit for the MAO loading. For example, ~8 mmol water/g silica (or 12.6 wt % water) charge starts showing MAO "flooding" out of pores to form "skin" wrapped sMAO particles and the activity is actually reduced due to significant surface area reduction, meaning MAO over fill to plug pores.

A water content of 4.3 (mmol/g silica) with about 6.2 (mmol TMA/g silica) derived sMAO can satisfy the activation needs for most of the gas-phase LLDPE catalysts. A lower water content results in a lower MAO loading and becomes less active, as expected. Therefore, useful water content range is 3.0 to 7.0 mmol/g silica for silica with a surface area about 300 m2/g or less. For a higher water loading, such as 5-6 (mmol water/g silica), the derived sMAO shows much higher activities (see Table 11 below).

An even higher MAO loading is possible for silica with a higher surface areas, such as PD14024 (600 m²/g) that can hold more MAO to avoid the formation of "skin wrapped" particles shown above; for example, 10 (mmol water/g silica) derived MAO with ~14 mmol Al/g silica loading has been demonstrated for this silica (Example 58 for catalyst preparation and polymerization example Poly V and Poly VI), the heat of reaction per gram silica now becomes much higher that more cooling power can be used for the same wet-silica addition rate, e.g., −20° C. to avoid the fragmentation of the formed sMAO (see sMAO formation temperature section for more details). A higher MAO loading to obtain a much higher activity is very useful when the catalyst is used in a sequential polymerization process to obtain, for example, a hetero-phasic copolymer composition such as impact copolymer (ICP), obtained from a multiple sequence reactor setup to allow the activity to drop to a still operable value when carrying into the last reactor. However, the increase of surface area means a hollower silica structure if the pore diameter is kept the same. The hollower silica structure becomes more mechanically fragile, which is a potential source of fines that may foul the reactor or can cause a pre-mature polymerization fragmentation to lose macro-pore derived stiff pores, especially harmful to sequential polymerization where the macro-pore derived stiff pores are used for rubber fill to avoid rubber flooding that fouls the reactor. Therefore, to increase the surface area, the pore diameter needs to be reduced to maintain the mechanical strength. However, MAO molecules cannot enter pores <50 angstroms; in this case, no MAO can form in pores <50 angstroms. Therefore, the surface area cannot be unlimitedly increased. To compromise the MAO loading and the mechanical strength, useful high surface area is limited to about 800 m²/g, and the pore diameter is limited to >50 angstroms.

A relatively accurate amount of water on silica evenly distributed in the pores can obtain the derived catalyst with good activity, operability, and polymer bulk density. "Relatively accurate" means that the water content can be over or off in a relatively large range, e.g., in the range of 4.3 to 5.0 (mmol water/g silica) charges the derived catalysts show similar operability, reactor parameter controls, and derived polymer properties but with different activities, i.e., the higher the water content, the higher the MAO loading, and the higher the activity for catalyst precursors with lower activation efficiency.

Raw silica usually contains a certain amount of absorbed water that is various with the environment temperature and humidity. The amount is usually less than the amount used for a desired MAO loading. Therefore, if the amount in the raw silica can be quantified after oxygen is purged out, the difference from the desired amount can be made up to obtain a desired water loading and therefore the calcination step may be eliminated. The analytical method of loss on drying (LOD) can be used to quantify the raw silica water loading. Another more straight forward method is the addition of a desired amount of water to silica that has been calcined to remove the unknown amount of water. For examples, silica can be calcined at higher than 150° C. under ambient $N_2$ flow, such as 200, 400, 600, or 875° C., to eliminate absorbed water. A different calcination temperature results in a different amount of hydroxyl groups on the silica pore surface that serve as the TMA and MAO molecule anchors, therefore to change the ratio of the anchored MAO (supported MAO, likely more sterically hindered, less active based on experimental evidence) to unanchored MAO (solid MAO, less sterically hindered, more active based on experimental evidence) on the supported MAO with a given MAO loading, which may result in different activities, slurry polymerization or super-condensing mode gas-phase polymerization operability, and comonomer insertion response or composition distribution (CD) response (More details in CD control section).

For wet-silica addition as a slurry, the water can be added to the silica before or after forming a slurry. Evenly distributed water molecules in silica pores are highly desired to obtain a supported MAO with good MAO distribution in the pore that is directly linked to the catalyst activity and the derived polymer bulk density. The Al/Si ratio of uncrushed vs. crushed sMAO (Al/Si(u-c)) through the XPS analysis can be used to quality control the in-situ sMAO Al distribution. Wet-silica solid in a close container heated at 55° C. for 5 hours (may not need that long) and wet-silica slurry agitated at ambient for 2 hours all are able to give an Al/Si(u-c)<3.0 that results in a desired derived polymer bulk density. It has been discovered that Al/Si(u-c) is also closely related to the control of the wet-silica addition into the cold TMA solution, i.e., a narrower range of the reaction temperature at a lower temperature gives a smaller Al/Si(u-c) ratio. If both are done well, the ratio can be controlled in the range of 1-1.5, which is highly desirable.

It has been mentioned above that the water loading determines the MAO loading due to the preferred addition sequence: water-silica addition to TMA solution. It has been observed that resulting sMAO has an almost constant Al:O ratio of close to 1.3-1.4:1, even with a significantly higher TMA:water ratio than 1.4:1. Actually because the wet-silica is slowly added into a TMA solution, the initial TMA:water ratio is extremely high; only the very last portion has a TMA:water ratio close to the charged ratio of TMA:water. The fixed Al:O ratio about 1.4:1 matches the formula of $(Al_4O_3Me_6)_4$ with 1 coordinated TMA (see FIG. 1, n=1, 17Al:12O=1.42:1). Therefore, ideally the TMA:water ratio should be controlled in the 1.3-1.5:1 range.

It should be understood that, although a TMA: water ratio of about 1.4:1 can be used to form the desired active MAO molecules, the process of adding water to the TMA solution allows the charging TMA:water ratio to be close to or less than 1:1 because the first portion of wet silica added to the TMA solution is still surrounded by excess TMA and forms the active sMAO structure. Only at the point when the TMA: water ratio is less than about 1.4:1 the gel molecules may start forming more significantly and the last portion of silica may not have TMA to react with. E.g., theoretically, for a 1:1 TMA:water charged ratio, 71% of the wet-silica added to the TMA solution can have an environment of an at least 1.4:1 TMA:water ratio and should consume all the TMA after 71% wet-silica is added. The rest of 29% wet-silica should theoretically have no TMA to react. However, due to MAO coordinated TMA and free TMA equilibrium in the TMA solution, the end point is expected not to be a clear cut. Instead, it is believed that when approaching 71% consumption of wet-silica, a partial gelation process occurs and increases thereafter and the portion of sMAO formed thereafter has a gradual reduction of activity due to the gradual reduction of active MAO loadings, indicated by the experimental observation. For example, by using a 200° C. calcined silica, from a TMA:water ratio gradually reducing from 1:5:1 to 1:30, the activity is a gradual reduction, not a clear cut, and only when at less than 1.33:1 the free TMA cannot be detected in the supernate at the end of addition. That been said, with close to 1:1 TMA:water charge, about 70% fully active supported MAO, a portion of sMAO with gradually reduced activity, and a portion of inactive sMAO and/or no MAO supported silica are likely obtained.

Therefore, by adjusting the TMA:water ratio at a lower value such as 1.33:1 for 200° C. calcined silica, a TMA/ MAO free supemate (solvent) can be obtained and the solvent can be directly reused without any treatment, which is particularly useful for the design of a continuing sMAO formation process where the solvent is recycled and reused. Another benefit is that such a TMA/MAO free supernate process may not need a filtration facility for the large scale catalyst preparation reactor system therefore to simplify the catalyst preparation reactor design to reduce the cost.

Theoretically, any concentration of TMA solution can be used, even the neat TMA liquid. However, a more diluted finished catalyst slurry concentration is the range of balanced batch efficiency and equipment operability for common silica supports with a pore volume of 1-2 cc/g. For a support with a higher pore volume, more diluted slurry may be desired to fit the equipment's agitation capacity. Therefore, if the wet-silica is added as solid, the TMA solution concentration can be more diluted, whereas if the wet-silica is added as a slurry, the TMA concentration can be more concentrated to have a more desired batch efficiency.

As described above, a low temperature environment can be used to allow the formation of the active MAO molecule, with the coordinated TMA as the active site, and limit the inactive MAO gel formation (FIG. 1). However, a practical cooling power should be considered for commercial production. The current studies have revealed that maintaining the reaction temperature in the range of −8 to −12° C. can yield an in-situ sMAO with performances comparable to regular sMAO with an MAO loading of 6-7 mmol Al/g silica, corresponding to about 4 to 5 mmol water/g silica derived in-situ sMAO. Another factor needed to consider for a practical operation is how fast the reaction heat can be removed to maintain the desired low temperature. A reactor with a lower heat removal efficiency will lead to a longer wet silica addition time. Therefore, efficient cooling power and efficient mixing of wet-silica and TMA can be used to provide a practical addition time range. Obtaining a higher MAO loaded in-situ sMAO is possible through the increase of water content, such as 7-8 mmol water/g silica mentioned above through the use of silica with a higher surface area, e.g., PD14024 with 600 m²/g, to avoid overfilled MAO. A higher water content requires more cooling power to remove the reaction heat. We have demonstrated that −20° C. can satisfy an 8 mmol water/g silica derived in-situ sMAO preparation, whereas −14° C. caused a significant sMAO fragmentation, both from ES70 silica calcined at 875° C.

The new MAO activation mechanisms proposed based on experimental results are simplified as follows:

(1)

Free TMA for metallocene alkylation

Cooridinated TMA as AlMe₂⁺ source for metallocene cationization $Cp_2MCl_2$    2 AlMe₃

Half Activation    2 Me₂AlCl    Full Activation (M = Tl, Zr, Hf)

TMA solution benefits the heat removal of the exothermic reaction to ensure the active MAO molecule formation. In the other hand, a more diluted solution results in a lower batch production efficiency if the reaction is a batch process. While a higher TMA concentration is desired for a higher batch production efficiency, the pyrophoricity of a higher than about 12 wt % TMA solution in use may be a safety concern. Another important factor to design the TMA concentration is the final sMAO slurry concentration and the finished catalyst product slurry concentrations, which are related to the reactor agitation capability and the support pore volume that determines the highest limit of the slurry concentration. For example, 22-26 wt % final sMAO and The new mechanisms in Eq. 1 (Luo & Diefenbach, Conf. abst., Adv. in Polyolefins, Santa Rosa, CA, 2009 & 2011; Luo, Wu, & Diefenbach, U.S. Pat. No. 9,090,720 (2015)) provide a guidance for the controls of the two key elements in MAO, the coordinated and free TMA, in the sMAO formation and single-site catalyst activation processes for the improvement of the finished catalyst performances. The methods provided herein allow the in-situ formation of supported MAO based on active MAO formation stoichiometry and conditions and how to construct the finished catalyst built on the in-situ formed supported MAO based on the new MAO activation mechanisms and the understanding of the interaction of MAO and TMA molecules in the pores of a support that requires a design/selection of the support parameters such as the surface area, the pore diameter, the pore volume, the particle size, and the control of the pore surface hydroxyl residue (e.g., through calcination or chemical modification) to obtain highly active, large polymerization reactor operable, and polymer property controllable catalyst compositions.

Any inert hydrocarbon solvent can be used, such as aromatic and aliphatic solvents. Aliphatic solvents are more preferred because MAO has a significantly lower solubility in an aliphatic solvent such as isohexane than in an aromatic solvent such as toluene. Aliphatic solvents with lower MAO solubility can limit possible MAO leaching into the solution. A significant amount of MAO dissolved in the sMAO supernate, if not removed, may later precipitate outside the sMAO particles to cost uneven distribution of Al and therefore results in a low polymer density. It may also cause undesired high initial polymerization heat, which is a reactor fouling factor, e.g., fouling by melted polymer resins. When an aromatic solvent is in use, a filtration/wash step may be applied to remove the soluble MAO in the supernate and an anti-fouling reagent may be added, such as a continuity agent. Suitable continuity agents include a long chain hydrocarbyl group, modified hydroxyl group(s) containing compounds such as MPS-1E, A-990, or Varonic s202 (see Continuity Agents section for more details).

Pentane, isohexane, heptane, isoPar E, isohexane-mineral oil mixture, isohexane and Hydrobrite oil mixture can be used. These solvents have no significant impact on activities of catalysts derived from a wet-silica with a lower water level, e.g., 4.3-5 mmol water/g silica, the high water level, e.g., 7-8 mmol water/g silica, caused significant sMAO fragmentation when a higher boiling point (bp) solvent such as isoPar E is used, presumably due to the lower heat removal capability. Low bp solvents such as pentane and isohexane can vaporize to help in heat removal at a lower temperature. Isobutane or propane, although is expected to be better for heat removal, may not be as practical as $C_5$-$C_7$ hydrocarbons due to the high vapor pressure at a higher temperature, e.g., when heating the sMAO at 85° C. (vide infra) to improve both activity and operability. The very low bp solvents are not as safe as higher bp solvents although they can be used.

Several methods can be used to prepare the wet-silica solid or slurry. One convenient way is the addition of water into a calcined silica hydrocarbon slurry in a container, which is then sealed and placed on a shaker or roller to agitate for certain time, e.g., 2-48 hours at ambient, to give the desired evenly distributed water in silica reflected by the evenly distributed MAO Al element through the XPS uncrushed-crushed analysis (Method I). Another way is the addition of a desired amount of water into calcined silica in a well-sealed container where the even distribution of water can be achieved by, e.g., heating the whole container at 50-60° C. for a couple of hours, which can potentially be done by the silica vendors that may not add significant cost. The water treated silica can then be put in the reactor directly with a solvent to form a slurry for immediate use (Method II).

The present disclosure also relates to catalyst systems for olefin polymerization, methods of producing the catalyst systems, and polyolefins formed from the catalyst systems. Embodiments of the present disclosure include methods for preparing a supported alumoxane by contacting at least one support material having absorbed water and at least one hydrocarbyl aluminum compound in a hydrocarbon solvent, preferably in an aliphatic solvent, at a temperature of from less than −5° C. to −60° C. The supported alumoxane is formed in-situ when the hydrocarbyl aluminum compound reacts with the absorbed water on the silica.

The freshly formed supported MAO (pre-sMAO) can be heat treated, with the heating temperature depending on the desired type of catalyst precursor used for polymerization, to convert to fully active sMAO prior to mixing with one or more catalyst precursors. Any free solvent or volatiles can then be removed to obtain the supported catalyst. The in-situ supported alumoxane is capable of working with both gas and slurry phase polymerization processes to obtain desirable polymer properties, including molecular weight (Mw), polydispersity index (PDI), polymer density (PD), composition distribution (CD, especially broad orthogonal composition distribution (BOCD)), bulk density (BD), melt index (MI), melt index ratio (MIR). It has been surprisingly discovered that some of these polymer properties such as BOCD can be tailored by adjusting the silica water load and/or TMA to water ratio, and the heat treatment of sMAO when forming the in-situ supported alumoxane.

When an aliphatic solvent is in use, the supported MAO is free of aromatic solvent. The supported aluminoxane can be made by adding an aliphatic solution of at least one support material having absorbed water to a hydrocarbyl aluminum aliphatic solvent solution at a temperature of from about less than −5° C. to about −60° C. The hydrocarbyl aluminum solution concentration can range from 0.1 to 40 wt %, preferably 1.0 to 20 wt %. Use of an aliphatic solvent instead of toluene provides a catalyst system (and polyolefin products) with no detectable amount of aromatic hydrocarbon solvent content while maintaining activity similar to that of catalyst systems prepared with pre-formed MAO that is only commercially available in toluene. Another advantage for using an aliphatic solvent instead of toluene is that a lower boiling point aliphatic solvent than toluene (110° C.) can be used, which makes the aliphatic solvent easier to remove from the catalyst slurry to obtain a finished catalyst solid, resulting in a less amount of less harmful solvent residue in the derived polyolefin products.

Accordingly, the embodiments provided herein demonstrate the ability to significantly reduce costs for making MAO based supported catalysts. The embodiments provided also eliminate the need for cooling facilities, and vessels for storing or transporting solution MAO. The gel formation issues that occur under cooling conditions, which is still changing the solution MAO compositions is also eliminated to allow better catalyst production and quality control.

Eliminating aromatic hydrocarbon solvent in the catalyst system also provides polyolefin products having no detectable aromatic hydrocarbon solvent (preferably no detectable toluene), as determined by gas phase chromatography. As used herein, the terms "detectable aromatic hydrocarbon solvent" means 0.1 mg/m$^2$ or more as determined by gas phase chromatography (GPC), and "detectable toluene" means 0.1 mg/m$^2$ or more as determined by GPC. The polyolefin products may be used as plastic materials for use in toluene-free materials such as in packaging for food products.

Supported Materials Having Absorbed Water

The support material can contain from 3 mmol absorbed water per gram of support material to 12 mmol absorbed water per gram of support material. The amount of absorbed water is determined by adding a known amount of water into the support hydrocarbon slurry in a close container and agitate to allow the water to distribute in the pore of the support and/or by a standard thermogravimetric analysis method, e.g., LOD (loss on drying) at the temperature 300° C. for 4 hours. Most commercial support materials will contain some absorbed water and in some cases the amount of absorbed water may be sufficient. In other cases additional water can be added or the support material can be dried and then the support material can be contacted with water. This can be accomplished, for example, by slurrying the silica in an aliphatic solvent, for example hexane, containing an amount of water sufficient to provide water absorbance onto the silica. In at least one embodiment, a support material is contacted with from about 3 mmol water/g support material to about 13 mmol water/g support material.

Preferably, the support material is silica, alumina, alumina-silica or a derivative thereof. Other natural or synthetic inorganic or organic/polymeric materials can also been used, e.g., clay, synthetic graphenes with functional groups such as hydroxyl groups on the surface, functional group substituted polystyrenes, and other materials either containing surface hydroxyl groups, polar groups, or other functional groups/atoms capable of interacting with water molecules. Preferably, the support material has an average particle size between 1 and 200 microns, an average pore volume of between 0.5 and 3 mL/g, and a surface area between 50 and 800 $m^2/g$, provided that for surface area <400 $m^2/g$, the water loading is in between 3-9 mmol/g silica and for surface area from 400-800 $m^2/g$, the water loading is in between 5-13 mmol/g silica and the majority of the pore diameter distribution is not smaller than 50 angstroms, preferably less than 60%, more preferably less than 40%, and most preferably less than 20%. The support material may has been treated with one or more of a Bronsted acid, a Lewis acid, a salt and/or a Lewis base. The support material may comprises a silylating agent. The support material comprises a hydrocarbyl aluminum compound. Preferably, one or more of the support material comprises an electron withdrawing atom or group, such as an F atom or a $C_6F_5$ or $C_6F_5O$ group and the like. The electron withdrawing atom or group sources include but not limit to inorganic, organic, and polymeric compounds that contain reactive electron withdrawing atoms or groups, and can be charge neutral or ionic compounds, such as $SiF_4$, $(NH_4)_2{}^+[SiF_6]^{2-}$, $AlRF_2$, $AlR_2F$ ($R=C_1$-$C_6$ hydrocarbyl group), $Al(OC_6F_5)_3$, $B(C_6F_5)_3$, and the like.

Solvents

Although any hydrocarbon solvent can be used including aromatic and aliphatic solvents, aliphatic solvent is more preferred. Suitable aliphatic solvents are liquid at reaction temperatures. Non-limiting example solvents are non-cyclic alkanes with formula $C_nH_{(n+2)}$ where n is 4 to 30, such as low to medium boiling point solvents isobutane, butane, isopentane, pentane, isohexane, hexane, n-heptane, n-octane, nonane, decane and their isomers, and higher boiling point solvents/oils such as isoPar E, mineral oil, Hydrobrite oil, and the like, and cycloalkanes with formula $C_nH_n$ where n is 5 to 30, such as cyclopentane, methylcyclopentane, cyclohexane, methylcyclohexane and the like. Suitable aliphatic solvents also include mixtures of any of the above.

Trimethylaluminum (TMA)

Trimethylaluminum (TMA) is the hydrocarbyl aluminum compound of choice, although a portion of the TMA can be replaced by other aluminumalkyls to modify the derived MAO performance. Useful compounds suitable for partial replacement of TMA include but are not limited to: $AlRX_2$ or $AlR_2X$, $AlR_3$, or any of the mixture, where X=F, large substituted phenoxides such as 2,6-di-tert-butyl phenoxy, or electron withdrawing group substituted aromatics such as $C_6F_5$— or $C_6F_5O$—, R=C1-C10 hydrocarbyl group, such as Me, Et, Bu, Octyl, and the like.

TMA to Water Ratio

The ratio of water absorbed in the supported material to the amount of hydrocarbyl aluminum compound can be from 1:0.95 to 1:100. Preferably, the ratio is from 1:1.5 to 1:20; more preferably, the ratio is from 1:1.5 to 10; and most preferably, the ratio is 1:1.5 to 1:3.

The alkylaluminum can be present in an amount of about 1.5 to 30 wt % aluminum based on the weight of the isolated solid product. Preferably, the amount of aluminum is between 5 wt % and 25 wt %, more preferably 6 and 20 wt %, based on the total weight of the isolated solid product.

Supported Active MAO and the Formation Conditions

Due to the inactive MAO gel is a more energetically favored MAO structure (FIG. 1), the control of the supported active aluminoxane formation environment is critical to limit the gel formation. The quantitative water treated silica (wet-silica) is added to a cold supported MAO formation environment, which is a TMA aliphatic solution cooled to −5° C. or lower, with the temperature of choice depending on the water content on the support. The higher the water content, the lower the cooling temperature required. For example, the rate of adding the wet silica with a water loading from 4 to 7(mmol/g silica) to the cold TMA solution can be so controlled that the average temperature is about −10° C. with the highest temperature not passing −8° C., while the addition rate of adding the wet silica with a water loading from 7 to 13 (mmol/g silica) to the cold TMA solution can be so controlled that the average temperature is about −20° C. with the highest temperature not passing −18° C. to obtain an in-situ supported MAO with the activation efficiency similar or better than the supported regular MAO with a similar MAO loading, if the TMA:water charging ratio is 1.3:1 or higher.

The water treated support is still a free flowing solid powder because the range of the amount of water useful for the catalyst preparation, e.g., 5-12 wt % for a support with about 300 $m^2/g$ surface area and about 1.5 mL/g pore volume, is significantly less than that the silica can hold, e.g., >50 wt %, to allow the water added to remain in the pores. Many additional methods can be used, e.g., as a wet-support aliphatic solvent slurry or as a wet-support solid. The wet-support slurry can be added at ambient or cold without significantly changing the performance. Cooling may be applied for a low boiling point solvent in use, such as $C_4$-$C_8$ aliphatic solvents. The purpose of cooling is to increase the viscosity of the low boiling point solvent slurry therefore to decrease the wet-silica settlement rate during the slow slurry addition.

The supported active MAO has a ratio of Al (derived from TMA):O (derived from water) of 1.3-1.5:1 (mol:mol), which can form as a major supported MAO product in an environment with a wider range of TMA:water ratio, e.g., 1.3:1 to 100:1, 50:1 to 1000:1, or higher.

In a batch reaction process, because the wet-support is added slowly to the TMA solution, at the beginning, the TMA:water ratio is rather higher. The TMA content is reduced gradually as the wet-support addition continues. Although the TMA:water charging ratio can be 1.3:1 or more to obtain the majority of supported MAO as active MAO, a lower than 1.3:1 TMA:water charging ratio can still be used to have a decent activity. For example, a 1:1 ratio can theoretically have about 75% of wet-support to react with 100% TMA to form the supported active MAO and the rest about 25% wet-support to obtain a theoretically 75% activity of the supported MAO formed from a 1.3-1.5:1 TMA:water charging ratio.

Experimental results indicate that because of the coordinated TMA and free TMA equilibrium in the system, the end point for the active MAO formation to stop and the gelated MAO to start is not a clear cut, i.e., when the TMA:water ratio is approaching a 1.3:1 ratio, both active MAO and gelled MAO form simultaneously; and as the TMA:water ratio gets lower and lower, the gelled MAO portion gets more and more increase. Also because the energetically favored gelation process is an irreversible reaction, the 100% active MAO formation conditions may not exist. However, the conditions can be so controlled that the active MAO can form as a major product, e.g., at a temperature lower than –10° C., –20° C., –40° C., or –60° C. to obtain >85%, >90%, >95%, or >99% supported active MAO composition in a TMA:water ratio>1.3:1 environment, e.g., from 1.33:1 to 100:1, from 1.5:1 to 1000:1, or higher.

If the TMA:water charging ratio is significantly less than the active MAO Al:O ratio, e.g., 1.33:1 for the active MAO formula $(Al_4O_3Me_6)_4$, TMA may be completely consumed before all the wet support is added. E.g., theoretically a 0.9:1 of TMA:water charging ratio may result in only about 68% wet support conversion to supported active MAO, and the rest 32% is remained as unreacted wet-support because of no TMA to react with. Again, due to the coordinated TMA and free TMA equilibrium, a portion of supported gelated MAO may also form, especially at a higher cooling temperature, e.g., higher than –5° C. Therefore, significantly less than 1.3:1 of TMA:water charging ratio is not preferred, e.g., less than 1:1, less than 0.9:1, or less than 0.7:1.

The supported active MAO can also form in a so-called continuing process where constant feeds of both wet support (as a slurry or as solid) and TMA solution can be continuingly mixed in a reaction device capable of effective heat removal. The preferred ratio of the TMA:water feeds is 1.3:1, more preferred 1.4:1, and the most preferred is 1.5:1, although a higher or lower ratio can also be used, e.g., 1.2:1 to 1:1 or 1.6:1 or higher, all mol:mol.

The Al on the in-situ sMAO can be present in an amount of about 1.5 to 30 wt % aluminum based on the weight of the isolated solid product. Preferably, the amount of aluminum is between 5 wt % and 25 wt %, more preferably 6 and 15 wt% , based on the total weight of the isolated solid product.

Heat Treatment of the Supported MAO

The supported alumoxanes, after being prepared in-situ, can be treated at a higher temperature for a certain period of time either in the form of slurry or a solid before contacting a catalyst precursor, such as a metallocene. The high temperature treatment can be in the range of 60-200° C., preferably, 70-140° C., and more preferably 80-120° C.

The heating time is heating temperature dependent. For a higher temperature, e.g., 85-120° C., the heating time can be 0.5-5 hours, or 1-3 hours, or about 2 hours; and for a lower heating temperature, e.g., 60-85° C., the heating time can be 2-8 hours, 4-6 hours, or 5 hours. Ambient aging can also play the role of heating, but requires a much longer period of time, e.g., about 16 hours, about 24 hours, or about 48 hours or longer. All these heating/aging processes are believed to convert the pre-supported MAO present as a major or a minor component in the supported MAO composition to supported active MAO composition. A higher heating temperature is preferred particularly for constructing a catalyst system comprising a catalyst precursor containing a transition metal in the lanthanide area or later in the periodic table that has higher net positive charge in the nuclei such as a hafnocene (e.g., M2) or any transition metals bearing a structurally open ligand, such as a bridging zirconocene (e.g., M3) or the half-metallocene known as constrain geometry catalyst (CGC) (e.g., dimethylsilyl(tetramethylcyclopentadienyl)(tert-butylamido)titanium dichloride), to presumably increase the MAO molecule size through enhancing the MAO dimerization process, which may require a longer heating time due to the poorer MAO molecule mobility on a support by comparing to the MAO molecule in a solution. The heating temperature for these catalyst precursors may be 85, 95, 100, or 120° C., and the heating time may be 4 hours, 6 hours, 10 hours, or longer.

The heating process can be also done under a high pressure, e.g., 10 psi, 100 psi, or 500 psi, or under a controlled vacuum pressure in between 0-760 torr, such as 500 torr, 300 torr, or 10 torr, or very close to zero. A high pressure or low pressure inert gas (e.g., $N_2$, Ar) flow may be applied to the high pressure or vacuum heating process.

While the heating or aging process can always increase the active MAO amount by converting the pre-MAO to active MAO, further heating of the formed active MAO can result in three activity changes: increase, almost unchanged, or decrease, depending on the MAO loading and the catalyst precursor structure of choice.

If the MAO loading is more than sufficient for the activation of the majority of a catalyst precursor, further heating of supported active MAO may increase the activity significantly if the catalyst precursor contains a metal center with very high net positive charge due to lanthanide contraction, e.g., a hafnocene such as M2, or any catalyst precursor that bears an open ligand framework, e.g., a bridging zirconocene such as M3, due to the heating enhanced dimerization of MAO to enlarge the MAO molecule to form a larger MAO anion that reduces the interaction of the resulting catalyst-MAO ion-pair effectively to allow an easy insertion of olefin monomers to the metal center. However, for the catalyst precursor has a metal center before the lanthanide elements (without the lanthanide contraction effect) in the periodic table and bears a structurally close ligand framework, e.g., a non-bridging metallocene such as M1, heating can affect the activity differently: 1) for MAO loading more than sufficient for the activation of the majority of a catalyst precursor, heating causes not so significant change of activity because the small MAO molecules are now large enough for a close catalyst structure to form the desired weak interacting ion-pair and the heating enhanced MAO size increase effect is not so obvious; and 2) for MAO loading just enough for the activation of the majority of a catalyst precursor, the activity can actually decrease due to the dimerization of MAO molecules that decreases the MAO molecule number and leaves some catalyst molecules without MAO molecules to activate.

The heating temperature and heating time are therefore determined by the MAO loading and the catalyst precursor in use.

The reaction mixture after contacting the support material having absorbed water and the hydrocarbyl aluminum compound in an aliphatic solvent at a low temperature can also be spray dried in a spray drying reactor at a higher temperature to evaporate the solvents/volatiles and form the solid product with a desired average particle size and particle size distribution. The preferred temperature range is 60-200° C., more preferred is 80-190° C., and the most preferred is 90-160° C.

Examples of catalyst compounds usable with the present technological advancement to form a catalyst system can be found in US patent application publications 2018/0051345 and 2019/0127497, the entirety of both of which are hereby incorporated by reference.

Suitable catalyst compounds including metallocene compounds and post metallocene compounds featuring at least two leaving groups are all suitable to be supported on the in-situ sMAO. The leaving groups can be halides such as F, Cl, Br, alkyls such as methyl, ethyl, butyl, $CH_2C_6H_5$, and the like, alkoxides such as OMe, OEt, OPr, $OC_6H_5$, $OC_6F_5$, and the like, amides such as $NMe_2$, $NEt_2$, $NPr_2$, and the like. The two leaving groups can be the same or different and can be monodentate or can be bridging to form a bidentate group.

Continuity Agents

Continuity agents include but are not limited to a long chain hydrocarbyl group modified hydroxyl containing compounds with the Formula I:

$$R_oX((CH_2)_mOH)_m \qquad (I)$$

Where R is a $C_4$-$C_{30}$ hydrocarbyl group with or without a heteroatom substituent or substituents; X is hetero atom or a main group metal atom, such as N or Al; o=1, 2 and n=1, 2, or 3, provided that o+n=the valence state of X; m=0, 1, 2, 3, 4. Non-limited examples are: $(CH_3(CH_2)_{16}$—$C(O)O)_2Al$ (OH) (aluminum distearate, MPS-1E), $CH_3(CH_2)_{17}N$ $(CH_2CH_2OH)_2$ (bis-2-hydroxyethyl stearylamine, AS-990), and Varonic 5202 provided by Evonik Nutrition & Care GmbH (2-mole ethoxylate of primary stearyl amine).

EXAMPLES

Embodiments discussed and described herein can be further described with the following examples. Although the following examples are directed to specific embodiments, they are not to be viewed as limiting in any specific respect.

In the examples that follow, examples of in-situ silica supported MAO (in-situ sMAO) formed from the reaction of wet silica slurry or solid with trimethylaluminum (TMA) were prepared under different conditions, according to one or more embodiments provided herein, and were combined with several different types of metallocene catalysts to form different catalyst systems that were then tested for ethylene and propylene polymerization. Catalyst activity, gas- and/or slurry-phase reactor operability, and comonomer and hydrogen responses were measured. The resulting polymers were also analyzed to determine the molecular weight (Mw), polydispersity index (PDI), composition (or comonomer) distribution (CD), melt index (MI), melt index ratio (MIR), polymer density (PD), and polymer resin bulk density (BD) for PE catalysts derived polymers and Mw and PDI in homo-PP polymer, Mw and PDI of components in bi-phasic impact copolymer (ICP), and the rubber content in ICP, derived from PP catalysts.

Raw Materials

The catalyst preparation, polymerization procedures and polymer characterizations for each example are described below. The raw materials used to prepare the in-situ sMAO, were: silica (PQ Corporation ES70X, ES70, and PD14024; Grace Davison 948 (G948); calcined at 200, 400, 600, and 875° C. for 4 hours, e.g., ES70X (200) means the silica has been calcined at 200° C. for 4 hours); TMA (Aldrich and Nouryon neat TMA used as is without further treatment); deionized water (in house, purged with $N_2$ 2 hours); iso-hexane (iC6, in house, purged with $N_2$ 2 hours and stored with 3 A molecular sieves at least 24 hours), pentane ($C_5$, Aldrich, purged with $N_2$ 0.5 hour and stored with 3 A molecular sieves at least 24 hours), heptane ($C_7$, Aldrich, purged with $N_2$ 2 hours and stored with 3 A molecular sieves at least 24 hours), isoPar E (high bp hydrocarbon solvent (boiling range 110-140° C.), in house, purged with $N_2$ 2 hours and stored with 3 A molecular sieves at least 24 hours), and Hydrobrite oil (in house, purged with slow $N_2$ flow with heating at 110° C. at least 2 hours).

M1was bis(1-Me-3-Bu-cyclopentadienyl)ZrCl₂ metallocene.

M2 was $(PrCp)_2HfMe_2$ metallocene.

M3 was $Me_2Si(H4-ind)_2ZrCl_2$ metallocene.

M4 was Rac-dimethylsilyl(4-(3',5'-di-tert-butyl-4'-methoxy-phenyl)-2-methyl indenyl)(4-o-biphenyl 2-hexyl-indenyl)zirconium dichloride metallocene.

M5 was ethylenebis(indenyl))zirconium dichloride metallocene.

XPS Al/Si Ratio Measurement Method

The XPS Al/Si uncrushed-crushed measurement of a finished catalyst or a sMAO is analyzed with this measurement to quality control the Al distribution in the silica pores. To measure this, uncrushed and crushed catalyst samples were analyzed in the PHI Quantera II X-Ray Photoelectron Spectrometer (XPS). The catalyst samples were crushed using a mortar and pestle inside a desiccator. Once the samples were mounted inside the XPS, a survey scan was performed to ID elements present, and then a high resolution multiplex scan set up to acquire only the elements of interest, which are C, O, Si, Al, Cl, and F. Energy is calibrated by matching the primary carbon is edge peak to 284.8 eV. Three regions of interest of each uncrushed and crushed catalyst sample was analyzed in this way and the resulting atomic % of each element was averaged. The Al to Si ratios for uncrushed and crushed sMAO or finished catalysts are obtained, respectively, and the value of Al/Si for uncrushed: Al/Si for crushed can be calculated.

Catalyst Preparation

The general catalyst preparation procedures include four main steps:
1. Preparation of wet-silica, as slurry or as solid;
2. Formation of in-situ sMAO by adding wet-silica to a cold TMA solution;
3. Heat treatment of freshly formed sMAO to convert pre-sMAO to active sMAO;
4. Mixing of the active sMAO with a metallocene to obtain the finished catalyst.

Reference I, II, and III—M1, M2, and M3 on Silica Supported Regular MAO

Commercial MAO solution was used to make M1, M2, and M3 supported catalysts to use as references to guide in-situ sMAO formation method development and the design of derived catalysts.

Reference Preparation Method I for Reference 1 and 3

The general preparation procedure for zirconocenes is as follows: under an inert atmosphere, e.g., dried $N_2$, calcined silica is charged into a Pt reaction vessel; in a second vessel are charged MAO 30% toluene solution (Grace) based on 6.4 mmol Al/g silica and M1 (Reference 1) diluted in toluene solution based on 401.1 mol Zr/g sMAO or M3 (Reference 2) diluted in toluene solution based on 301.1 mol Zr/g sMAO, and mixing for 30 minutes to 2 hours, depending on the batch size (the larger the longer agitation time) at ambient. The MAO metallocene mixture is then slowly added into the silica solid with agitation to form an about 20-24 wt % slurry. After 1-3 hours of well mixing, the volatiles are removed by heating at 70-75° C. under vacuum (e.g., 1-3.5 psia), optionally with $N_2$ flow protection for a large scale reaction where the reactor cannot be placed in the drybox, to obtain the solid finished catalyst with a desired amount of solvent residue, e.g. 2-3 wt %.

Reference Preparation Method II for Reference 2

Under an inert atmosphere, e.g., dried $N_2$, in a reaction vessel are charged MAO 30% toluene solution (Grace) based on 6.4 mmol Al/g silica and M2 diluted in toluene solution based on 40 μmol Zr/g sMAO, and mixing for 30 minutes to 2 hours, depending on the batch size (the larger the longer agitation time) at ambient. To the MAO metallocene mixture is then slowly added the calcined silica solid with agitation to form an about 20-24 wt % slurry. After 1-3 hours of well mixing, the volatiles are removed by heating at 70-75° C. under vacuum (e.g., 1-3.5 psia), optionally with $N_2$ flow protection for a large scale reaction where the reactor cannot be placed in the drybox, to obtain the solid finished catalyst with a desired amount of solvent residue, e.g. 2-3 wt %.

Example 1-8

Heating Effects on In-Situ sMAO for Non-Bridging M1 Zirconocene Activation

Catalyst Preparation Method IA (Method IA, Small Scale Preparation)

Major equipment: freezer to cool wet-silica slurry in a container; 600 mL Ace Glass jacketed filter reactor for sMAO formation and finished catalyst preparation.

Wet-Silica Formation Method I: The wet-silica slurry was prepared in a drybox, where 30 g of ES70X silica (51 μm, 291 m2/g, 1.58 cc/g, 200° C. calcination provided by PQ) was charged into a 200 mL bottle with 108 g iC6, and 2.75 g deionized water (5.1 mmol $H_2O$/g silica). The silica slurry was allowed to shake on a shaker at room temperature for 2 hours. The silica slurry was cooled in the freezer set at −30° C. for about 30 minutes to reach −10 to −12° C.

sMAO Formation: Also in the drybox, 146 g isohexane was charged into the 600 mL Ace Glass jacketed filter reactor equipped with a mechanical stirrer. The reactor with solvent was cooled to below 0° C. where the filter cap was checked for leak (if leaking, tighten the filter cap) and then trimethylaluminum (TMA, Aldrich) 16.3 g (7.5 mmol/g silica) was added. Once the temperature reached below −10° C., the cold silica slurry was slowly added to the TMA solution with a pipette and the addition rate was so controlled that the average internal reaction temperature was maintained at −10° C. and not over −8° C. (~1 hour). After the silica slurry addition, the reaction temperature was brought up to 1° C. for 30 minutes and then brought up to ambient. This sMAO slurry was sampled to isolate a small portion of solid for XPS uncrushed/crushed Al/Si ratio test that gives 1.78. The supernate contained unreacted TMA 11% based on NMR quantification. The sMAO were aged at ambient for 3-4 days before they were used for the heating studies in Example 1-8 below.

Heating of sMAO: the heating effects are the focus in this study. Two in-situ sMAO samples with different MAO loadings, i.e., 5.1 mmol water/g silica with 7.5 mmol TMA/g silica as described above and 4.3 mmol water/g silica with 6.5 mmol TMA/g silica following the similar procedure, respectively, were used in the study. The details of different heating treatment conditions are described in Example 1-8 below.

Finished Catalyst: all finished catalysts were obtained by adding the neat M1 non-bridging metallocene into the sMAO slurry, agitating at ambient for 2 hours, filtering to remove the solvent to obtain a wet cake, and drying the wet cake under the vacuum to a constant weight.

Gas-Phase Ethylene Polymerization: Standard polymerization procedure Poly Ia as described in Polymerization Testing section was used to run catalysts for Example 1-8.

Example 1: M1 on Ambient Aged In-Situ sMAO Without Further Treatment

A small amount of the sMAO slurry without further treatment was filtered and vacuum dried at ambient to know the solid weight. 1 g of the dried sMAO solid was mixed with 5 g iC6 and 17.5 mg bis(1-Me-3-Bu-cyclopentadienyl) $ZrCl_2$ metallocene (M1) based on 40 μmol/g charge and shaken on a shaker for 2 hours at ambient. The catalyst was then vacuum dried at ambient to remove solvent. The 2L reactor salt-bed gas-phase polymerization test gave 4,885 g/g cat/h vs. Regular sMAO-M1 standard (Reference I) 2,912 g/g cat/hr.

Examples 2-3: M1 on Ambient Aged In-Situ sMAO With Heat and Extra TMA Treatment A small amount of the sMAO slurry was charged into a high pressure tube with 5 drops of neat TMA and heated at 85° C. for 4 hours. The slurry was filtered and dried under vacuum at ambient to obtain about 5 g sMAO solid. Into two 20 mL vials were charged with 1.0 g of sMAO solid and 5 g of iC6, respectively. To one of the vials, 14.5 mg (35 μmol/g) M1 was charged and the other 24.2 mg (60 μmol/g). Both were shaken on a shaker for 2 hours. The solvent was removed by vacuum drying at ambient to constant weight. The 2 L reactor salt-bed gas-phase polymerization tests gave 4,773 and 5,124 g/g cat/h, respectively, vs. regular sMAO-M1 standard (Reference I) 2,912 g/g cat/hr.

Example 4: M1 on Ambient Aged In-Situ sMAO Solid With Heat Treatment

To a vial, 1.0 g of sMAO solid was added and heated at 85° C. without solvent in an oil bath for 4 hours. The solid was then mixed with 5 g iC6 and 17.5 mg M1 (40 μmol/g) and agitated for 2 hours. The resulting slurry was vacuum dried to remove solvent to constant weight. The 2 L reactor salt-bed gas-phase polymerization tests gave 3,069 g/g cat/ hr vs. regular sMAO-M1 standard (Reference I) 2,912 g/g cat/hr. The polymerization results are summarized in Table 1.

TABLE 1

| 5.1 mmol water/g and 7.5 mmol TMA/g silica with M1 | | | | |
| --- | --- | --- | --- | --- |
| Cat ID | Heat Treat w/ or w/o TMA | Treated sMAO Form | M1 Charge (μmol/g sMAO) | Poly Ia Activity (g PE/g cat/h) |
| Example 1 | No heat treatment | No treatment | 40 | 4,885 |
| Example 2 | 85° C. 4 h w/TMA | Slurry | 35 | 4,773 |
| Example 3 | 85° C. 4 h w/TMA | Slurry | 60 | 5,124 |
| Example 4 | 85° C. 4 h w/o TMA | Solid | 40 | 4,804 |
| Reference I | NA    NA | NA | 40 | 2,912 |

Examples 5-8: M1 on Lower MAO Loaded In-Situ sMAO Treated Under Different Conditions Similar procedures of Catalyst Preparation Method 1A were repeated but with the water loading on silica changed to 4.3 (mmol/g silica) and TMA charge was changed to 6.5 (mmol/g silica). Those polymerization results are summarized in Table 2.

TABLE 2

| 4.3 mmol water/g and 6.5 mmol TMA/g silica with M1A | | | | |
| --- | --- | --- | --- | --- |
| ID | Heat Treat w/ or w/o TMA | Treated sMAO Form | M1A Charge (μmol/g sMAO) | Poly Ia Activity (g PE/g cat/h) |
| Example 5 | No heat treatment | No treatment | 40 | 4,279 |
| Example 6 | 85° C. 4 h w/TMA | Slurry | 40 | 3,764 |
| Example 7 | 85° C. 4 h w/o TMA | Slurry | 40 | 3,583 |
| Example 8 | 85° C. 4 h w/o TMA | Solid | 40 | 3,069 |
| Reference I | NA    NA | NA | 40 | 2,912 |

Table 1 and 2 show in-situ sMAO derived M1 catalysts display better activities without heating, with the higher MAO loading one showing a significantly higher activity. But after heating, while the catalyst with the higher MAO loaded sMAO displays somehow constant high activities, the lower MAO loaded in-situ sMAO shows decreasing activities to match the regular sMAO derived M1 with a similar MAO loading (Reference I).

Example 9-16: Heating Effects on In-Situ sMAO for Hafnocene M2 Activation

Catalyst Preparation Method IB (Method IB, Large Scale Preparation)

Major equipment: 600 mL Ace Glass jacketed filter reactor for wet-silica slurry cooling; 4 L Ace Glass jacketed filter reactor sMAO formation and finished catalyst preparation.

Wet-Silica Formation Method 1: The method used here is similar to the method used in Example 1-8 but with a large scale. The general procedures are as follows. In a drybox, 50-300 g silica (e.g., ES70X, 51 μm, 291 m2/g, 1.58 cc/g, 200° C. calcination provided by PQ) was charged into a 1 L bottle for 50 g scale or divided into three equal amounts in 3×1 L bottles (100 g each) for 300 g scale. Each bottle was charged with 180 g (for 50 g silica) or 360 g (for 100 g silica) of $C_7$, following by deionized water 6.48 g (7.2 mmol $H_2O$/g silica) for a 50 g silica preparation for Example 9-14 or 11.7 g (6.5 mmol $H_2O$/g silica) per bottle of the 3×1 L bottle each containing 100 g silica for Example 15-16. The bottle(s) were taken out of the drybox and placed on a roller to roll at room temperature for 2 hours (80 rpm), and then were taken back into the drybox to cool to –10 to –12° C. in the 600 mL Ace Glass jacketed filter reactor and used immediately or placed at ambient overnight for next day's sMAO preparation, also cooled to –10 to –12° C. in the 600 mL reactor before adding to the cold TMA solution in the 4 L reactor; either way results in no significant performance differences.

sMAO Formation: Also in the drybox, 1,000 g iC6 (for Example 9-14) or 700 g $C_7$ (for Example 15-16) was charged into the 4 L Ace Glass jacketed filter reactor equipped with a mechanical stirrer. The reactor with solvent was cooled to below 0° C. where the filter cap was checked for leak (if leaking, tighten the filter cap) and then trimethylaluminum (TMA, Aldrich) 49.7 g (13.8 mmol/g silica) for the 50 g silica preparation for Example 9-14 or 183.86 g (8.5 mmol/g silica) for the 300 g silica preparation for Example 15-16 was added. Once the temperature reached below –10° C., the cold silica slurry was slowly added to the TMA solution with a pipette and the addition rate was so controlled that the average internal reaction temperature was maintained at –20° C. and not over –18° C. (~1 hour) for Example 9-14 and –10° C. and not over –8° C. (~3 hours) for Example 15-16. After the silica slurry addition, the reaction temperature was brought up to 1° C. for 30 minutes and then brought up to ambient.

Heating of sMAO: the heating effects are the focus in this study. For Example 9 and 10, the sMAO was heated as is in the original iC6 slurry at 40° C. for 2 hours and at 60° C. for 4 hours, respectively, without changing the reactor. For Example 11 and 12, the iC6 solvent of sMAO slurry was removed by filtration and the solid was transferred to a 500 mL Cel-Stir reactor and 174 g C8 was added to form a slurry, which was heated at 100° C. and 105° C. for 3 hours in an oil bath, respectively. The slurry after heating was filtered to remove $C_8$ and washed with 2×70 g iC6 dried overnight to obtain the solid sMAO. For Example 13 and 15, the sMAO slurry was filtered and dried under vacuum before it was placed in a beaker (for 50 g silica preparation) or kept in the 4 L reactor (for 300 g silica preparation) to heat as solid at 100° C. for 4 hours. For Example 14, the sMAO slurry was filtered and isoPar E was added to form a slurry again in the same reactor, which was heated at 100° C. for 1.5 hours. For Example 16, the sMAO was heated as is in the original $C_7$ slurry at 85° C. for 5 hours without changing the reactor.

Finished Catalyst: all finished catalysts for Example 9-16 were obtained by adding the neat M2 hafnocene into the sMAO slurry in iC6 or $C_7$ based on 40 μmol/g sMAO, agitating at ambient for 2 hours, filtering to remove the solvent to obtain a wet cake, washing with iC6 when $C_7$ was used, and drying the wet cake under the vacuum to a constant weight.

Gas-Phase Ethylene Polymerization: Standard polymerization procedure Poly Ib as described in Polymerization Testing section was used to run catalysts for Example 9-14. Standard polymerization procedure Poly VI as described in Polymerization Testing section was used to run catalysts for Example 15-16.

Wet-Silica Method II: This method forms a wet-silica solid first before a solvent is added to form a wet-silica slurry. An example is as follows: In a 2 L round bottom flask, 300 g silica was charged and sealed with a rubber septum, and 27.0 g water was injected and mixed well before it was placed in an oven set at 55° C. for 5 hours. The wet silica was cooled to ambient and mixed with 1,008 g iC6, and then transferred as 3 portions to the 600 mL jacketed reactor where the slurry was cooled to −10 to −12° C. before going to the in-situ sMAO formation step.

Wet-Silica Method III: This method forms a wet-silica solid first before a viscous hydrocarbon solvent is added to form a wet-silica slurry which can be added at ambient.

Wet-Silica Method IV: This method forms a wet-silica solid first and is added as solid.

Examples 9-16: M2 on In-Situ sMAO Under Different Heating Treatment Conditions Similar procedures were applied but with M2 with 7.2 (mmol water/g silica) and 13.8 (mmol TMA/g silica) with different heating conditions. Table 3 summarizes the relevant catalyst preparation conditions and polymerization results obtained from the Lab 2L reactor (Examples 9-14). Table 4 summarizes the relevant catalyst preparation conditions and polymerization results obtained from the Pilot R122 reactor (Examples 15-16).

(i.e., the MAO anion), due to 72 protons in the Hf center but only 40 protons in the Zr center, both with almost identical nucleus size. Heating is believed to dimerize or oligomerize the small MAO molecules to become larger therefore to reduce the ion-pair tightness for hafnocenes, whereas the size effect is not so obvious because without heating the MAO size is already large enough to weaken the zirconocene ion-pair interaction due to the zirconium center has much less positive charges.

A higher MAO loading, e.g., 5.1 (mmol water/g silica), for M1 is more than enough to fully activate the M1 metallocene. The number of MAO molecules reduced after the dimerization of small MAO molecules to form larger MAO molecules through the heating are still enough for the M1 activation, therefore the change of activity before and after heating is not so significant. Instead, the increased amount of M1 results in a more active catalyst (Table 1 Example 3 vs. Example 2). However, once the MAO loading to the M1 charge ratio is close to the border of a full activation ratio, e.g., 4.3 (mmol water/g silica), the number of MAO molecules reduced now results in a decrease of the

TABLE 3

7.2 mmol water/g and 13.8 mmol TMA/g silica with M2 in Lab 2L reactor (Poly I).

| ID | Heat Treatment w/or w/o TMA | sMAO Form of Treatment | Water (mmol/g silica) | TMA (mmol/g silica) | Poly I Activity (g PE/g cat/h) |
|---|---|---|---|---|---|
| Example 9 | 40° C. 2 h w/TMA | Slurry | 7.2 | 13.8 | 3,249 |
| Example 10 | 60° C. 4 h w/TMA | Slurry | | | 4,060 |
| Example 11 | 100° C. 3 h w/o TMA | Slurry | | | 5,336 |
| Example 12 | 105° C. 3 h w/o TMA | Slurry | | | 6,630 |
| Example 13 | 100° C. 4 h w/o TMA | Solid | | | 8,287 |
| Example 14 | 105° C./1.5 h w/o TMA | Slurry | | | 4,241 |
| Reference II | NA | NA | NA | 4.3 (O) | 6.4 (Al) | 6,991 |

*Hf loading is 40 μmol/g sMAO for all catalysts;
**the preparation for this set of catalysts were from different preparation based on the procedure Method IA

TABLE 4

6.5 mmol water/g and 8.5 mmol TMA/g silica with M2 in Pilot R122 Polymerization (Poly VI).

| Cat ID | Silica (Calc'd T ° C.) | Water (mmol/g silica) | TMA (mmol/g silica) | sMAO Heating (° C.) | Poly VI Activity (g/g cat/hr) |
|---|---|---|---|---|---|
| Example 15 | ES70 (400) | 6.5 | 8.5 | 100/as solid | 5,833 |
| Example 16 | ES70X (200) | | | 85/heptane | 5,198 |
| Reference II | ES70 (875) | 4.3 (O) | 6.4 (Al) | N/A | 5,752 |

*Hf loading is 40 μmol/g sMAO for all catalysts.

This data shows that M2 hafnocene needs a much higher water loading (i.e., MAO loading) with heating at a higher temperature, e.g., 6.5 (mmol water/g silica) and 8.5 (mmol TMA/g silica) and 100° C. (Table 4, Example 15) to match the activity of the regular MAO derived supported M2 reference corresponding to a 4.3 (mmol $H_2O$/g silica) MAO loading (Reference I) and 7.2 (mmol water/g silica) and 9.3 (mmol TMA/g silica) and 100° C. heating to outperform the regular MAO reference (Table 3, Example 13).

Without wishing to be bound by theory, the different heating effects is believed to be the lanthanide contraction effect that causes the hafnium cation center having much higher net positive charge than the zirconium cation center and therefore results in a much tighter ion-pair for the hafnocene than for the zirconocene, with the same anion activity to approach the regular sMAO version. This is an indication that the regular sMAO has more large MAO molecules than the fresh in-situ sMAO has, supported by the evidence that the MAO number sensitive M1 zirconocene is more active before heating due to more MAO molecules when comparing to the regular sMAO with the same MAO loading. On the other hand, the fresh in-situ sMAO activated MAO size sensitive M2 hafnocene has only about half of the activity of the regular sMAO version even with a much higher MAO loading (Table 3, Example 9). However, after heating, the same MAO loaded in-situ sMAO can outperform the regular sMAO (Table 3, Example 13).

Example 17-18: Heating Effects on In-Situ sMAO for Bridging Zirconocene M3 Activation Catalyst Preparation Method IB used for Example 9-16 was used to prepare Example 17-18 catalysts with $C_7$ as solvent and 300 g ES70X (200° C.) in use. The water loading was 5.0 (mmol/g silica) and the TMA charge was 7.5 (mmol/g silica). The sMAO formation average temperature was −10° C. and not over −8° C. The sMAO $C_7$ slurry was first sampled after 60° C. heating for 4 hours to make the M3 catalyst (Example 17) and the rest was heated at 95° C. for another 4 hours to make another M3 catalyst (Example 18). Standard polymerization procedure Poly Ia as described in Polymerization Testing section was used to run catalysts for Example 9-14 and Reference 3. The results along with a regular MAO derived analog are listed in Table 5.

TABLE 5

| | | | | Activity Comparison of M3 on in-situ sMAO heated with different temperatures | | | |
| ID | Silica | Water (mmol/g silica) | TMA (mmol/g silica) | SMAO formation Temp (° C.) | SMAO heating/time | Cat/ (μmol/g SMAO) | Poly I Activity (g/g cat/h) |
| --- | --- | --- | --- | --- | --- | --- | --- |
| Example 17 | ES70X (200) | 5.0 | 7.5 | −10 | 60° C./4 hr | M3/30 | 3,583 |
| Example 18 | | | | | 95° C./4 hr | M3/30 | 7,455 |
| Reference 3 | G948 (600) | 4.3 (O) | 6.4 (Al) | N/A | N/A | M3/30 | 3,685 |

Table 5 data for M3 heating treatment study show that, even with about 17% higher MAO loading vs. Reference 3, if the heating temperature is not high enough, the in-situ sMAO only displays an activity similar to the lower MAO loaded regular sMAO (Table 5 Example 17 vs. Reference 3); however, if the heating temperature is high enough, about 100% activity enhancement can be achieved (Table 5 Example 18 vs. Reference 3).

This observation is consistent with the metallocene structure of M3 that has the dimethylsilyl group to bridge two cyclopentadienyl rings to open the metal center for larger comonomers to insert as the ligand design purpose. The open metal center now requires a larger anion to reduce the metallocenium-MAO anion ion-pair interaction to allow monomers to insert more easily. Unlike MAO molecules in solution state that can move freely, the supported or solidified MAO molecules likely require a higher energy to meet and dimerize to form bigger molecules.

Example 19-20 and Comparative Example
1—Active MAO Formula Validation and Low
Temperature Heating or Ambient Aging to Convert
Pre-sMAO to Active sMAO Catalyst Preparation Method IB used for Example 9-16 was used for Example 19, 21-22 and Comparative Example 1 except changing the water loading and TMA charges indicated in Table 6. Example 20 also used Catalyst Preparation Method IB but the wet-silica slurry was prepared according to Example 25 described below. 300 g silica was used for Example 19 and 20 and 200 g silica was used for Comparative Example 1. M1 metallocene was used for the four samples with 40 μmol/g sMAO charge. The sMAO slurry treatment conditions are listed in Table 6 as well. The supemate samples of sMAO before and after treatment were sampled for $^1$H NMR analysis. The comparative example (Comparative 1) catalyst was prepared using the sMAO right after the formation of sMAO without aging or heating.

heating or ambient aging always increase activities vs. a direct preparation of finished catalyst without aging or heating the freshly formed sMAO, such as the Table 6 data showing.

Heating can also decrease the soluble Al-Me containing species in the sMAO supemate that shows as either a sharp TMA peak or both a sharp TMA peak and a broad peak similar to the MAO extracted with THF from the in-situ sMAO except no detectable $AlMe_2(THF)_2^+$ by $^1$H NMR in THF-d8. Depending on the starting charge of TMA:water ratio in the range of 1.3 to 1.6:1, the soluble MAO like species and/or TMA either become significantly less for a higher TMA:water ratio (1.5-1.6:1) or disappears completely for a lower TMA:water ratio (close to 1.3-1.4:1), especially for a low temperature calcined silica (e.g., 200° C.).

Figure 2:
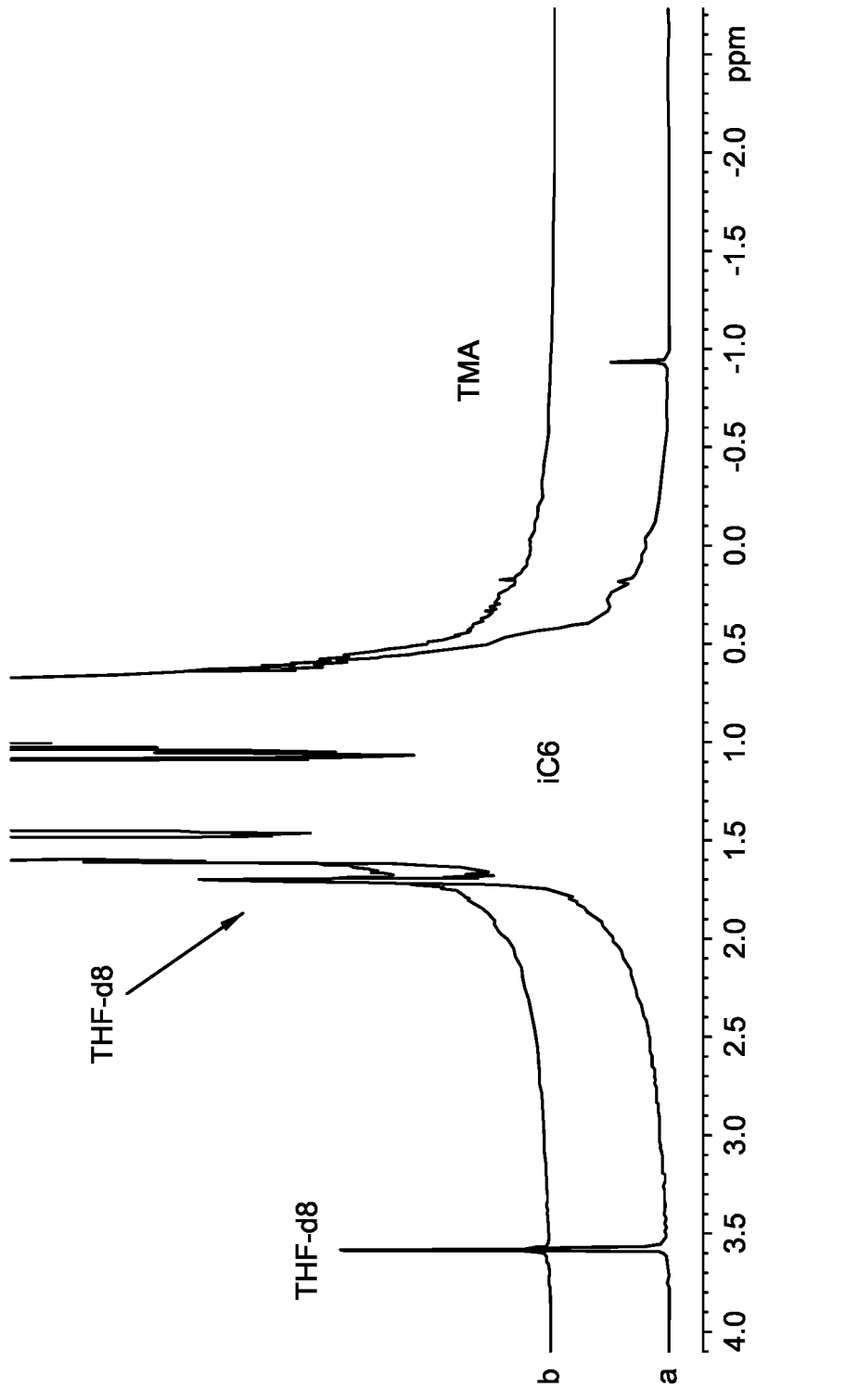
FIG. 2 is a H1 NMR spectra of in-situ sMAO supernate before (a) and after 60° C. heat treatment described in Example 34.

For example, the sMAO supernate before and after 60° C. 4 hours heating shows the disappearance of the TMA peak in H1 NMR spectra shown in FIG. 2 from a to b, for a TMA:water ratio of 1.42 in Table 6, Example 20. If the charge of TMA:water ratio is >1.4, e.g., Example 19 and Comparative Example 1 both having 1.5:1 TMA to water ratio, the TMA left in the supernate after the sMAO formation was quantified with NMR spectroscopy to show about equal the amount of 1.5 mmol/g (charge) −1.4 mmol/g (consumed) to indicate the active sMAO having a formula with Al:O=about 1.4:1, consistent with Sinn/Kaminsky's active MAO formula of $(Al_4O_3Me_6)_4$ with one coordinated TMA, i.e., 17Al:12O=1.42:1.

If the TMA to water ratio is higher, e.g., 1.5-1.6:1, a portion of MAO like species in supernate can be detected although the portion is very small and the NMR spectrum needs to be significantly enlarged to see this broad peak overlapped with the TMA peak as shown in FIG. 3a, which is from the supernate of Example 19 with the TMA:water ratio 1.5. However, this MAO like broad peak has no detectable $[AMe_2(THF)_2]^+$ species as shown in FIG. 3b

TABLE 6

| Cat ID | Poly ID | Silica (Calc'd T ° C.) | Water (mmol/g silica) | TMA (mmol/g silica) | TMA/water | sMAO treatment (° C./hr) | Activity (g/g cat/hr) |
| --- | --- | --- | --- | --- | --- | --- | --- |
| Reference I | Poly Ia | G948 (600) | | | | | 2,912 |
| Example 19 | Poly Ia | ES70X (200) | 5.0 | 7.5 | 1.50 | 60/4 | 3,732 |
| Example 20 | Poly Ia | ES70X (200) | 5.0 | 7.1 | 1.42 | 60/4 | 3,968 |
| Example 21 | Poly Ia | ES70 (875) | 6.0 | 8.2 | 1.37 | 60/4 | 4,675 |
| Example 22 | Poly Ia | ES70X (200) | 4.8 | 6.8 | 1.42 | 85/4 | 4,418 |
| Example 1 | Poly Ia | ES70X (200) | 5.1 | 7.5 | 1.47 | 25/72 | 4,885 |
| Comparative 1 | Poly Ia | ES70X (200) | 5.0 | 7.5 | 1.50 | 25/<1 | 3,040 |

While Example 1-18 show that a higher temperature can change the activities in all directions, increasing, decreasing, or remains almost unchanged, depending on a metallocene structure in use and the MAO loading, the low temperature obtained from any of the in-situ sMAO extracted with THF and analyzed by H1 NMR in THF-d8 solvent. This species is formed through the THF cleavage of the coordinated TMA (as shown in Eq 1), which is the major MAO active site. Either the regular sMAO or the in-situ sMAO THF extraction shows such a species, e.g., THF extraction for catalyst from the Example 19-22 listed in Table 6.

On the other hand, for 1.3-1.4:1 TMA:water ratio, such as Example 21 in Table 6, after formation of sMAO, the supernate without any treatment shows neither TMA nor MAO like species. Indicating that if more wet-silica is added, there will be no TMA to react. This has suggested a TMA to water ratio limit, i.e., 1.3-1.4:1. Lower TMA:water ratio will result in a portion of unreact water-silica, which when heated, may allow the unreacted water to continue to react with active sMAO to turn them to gel.

A portion of in-situ sMAO supernate containing the MAO like species from Example 20 was mixed with ethylene(bis (indenyl))zirconium dichloride (M5 highly active 1-hexene polymerization catalyst precursor) and showed neither activation nor activity with 1-hexene, as expected. The details are described in Example 34. This suggests that the active ES70X (200° C.) with a surface area around 300 m$^2$/g, the useful water loading is in the range of 4-8 mmol water/g silica. The water loading in the middle, i.e., 6 mmol/g silica (9.7 wt % water), was used in this study with TMA charge of 8 mmol/g silica to give a TMA:water ratio=1.33. 50 g ES70X (200° C.) was used to form a silica slurry with C$_7$. The average sMAO formation temperature was controlled at −5° C. and not over −4° C. M2 metallocene was used to make Comparative Example 2 and 3, with the former using sMAO without aging or heating and the latter using sMAO after 5 hours heating at 85° C. The two catalysts were tested with salt-bed gas-phase ethylene polymerization using Poly Ib procedure described in Polymerization Test section, and the results are compared with results from M2 on in-situ sMAO with similar water loading but formed at −10° C. in Table 7.

TABLE 7

| In-Situ sMAO Formation Temperature Effect on M2 Catalyst Activity | | | | | | |
|---|---|---|---|---|---|---|
| ID | Poly ID | Silica | Water (mmol/g silica) | TMA (mmol/g silica) | SMAO formation T (° C.) | Activity (g/g cat/h) |
| Comparative 2 | Poly Ib | ES70X(200) | 6 | 8 | −5 | 685 |
| Comparative 3 | Poly Ib | ES70X(200) | 6 | 8 | −5 | 639 |
| Example 23 | Poly Ib | ES70X(200) | 6 | 8 | −10 | 3,854 |

MAO formation may go through a multiple-step process including the formation of the small, aliphatic soluble inactive molecules before dimerize/oligomerize to form the active MAO molecules. The heating process may help to accelerate the formation of the active, agglomerated molecules, such as the tetramers shown in FIG. 1. An ambient temperature aging can also increase the activity, but takes a much longer period of time, e.g., days.

Another observation is that the heating process also helps to reduce the THF extractable MAO, believed to be the dimerization/oligomerization of smaller, more soluble non-anchored MAO molecules to become either larger, insoluble unanchored MAO molecules or dimerization/oligomerization with anchored MAO molecules to become anchored. The soluble unanchored active MAO molecules presumably cause the slurry polymerization fouling if no heat treatment to reduce the solubility. This observation is supported by the slurry polymerization results (Table 10).

In summary, low temperature heating such as 40-60° C. or ambient aging (e.g., 24 hours) after the fresh in-situ sMAO formation is believed to convert the pre-sMAO to active sMAO, whereas a higher temperature, e.g., 85-130° C., can enlarge the MAO molecule size and change the activity of a size sensitive metallocene more significantly. The low temperature or ambient aging treatment always increase the sMAO activity because of the conversion of non-active MAO to active MAO, whereas the high temperature heating is catalyst structure dependent and MAO loading dependent, i.e., the activity can go higher, lower, or almost unchanged because of MAO number decrease due to dimerization/oligomerization to form bigger MAO that decreases the MAO number.

Example 23 and Comparative Example 2 and 3: Active In-Situ sMAO Formation Temperature Boundary for Common Silica Catalyst Preparation Method IB described in Example 9-16 was used in these two comparative examples. For silica The data in Table 7 shows that the most critical condition to form an active in-situ sMAO is the reaction temperature. The activities of the two comparative examples are all significantly lower than 1,000 g/g cat/hr, the operable limit of a catalyst in the larger pilot or commercial unit. Based on FIG. 1, because the MAO gel formation is much more energetically favored, the sMAO formation temperature should be cold enough to retain the active MAO structure to limit (cannot eliminate) the formation of gel MAO as the major product. And based on Table 6 results, the reaction temperature boundary for water loading of 4-6 mmol/g silica should be in between −5 to −10° C. to enable M2 to have a >1,000 g/g cat/hr practical activity. And for water loading higher than 6 mmol/g silica, a lower reaction temperature, e.g., −20° C. may be required.

Another useful observation is that many experimental evidences support that even under the cooling condition the gel MAO formation and active MAO formation always coexist, just at a lower temperature the active MAO formation has a higher ratio. Therefore, with the TMA:water charging ratio matching the active MAO formula 1.33, at a lower temperature, e.g., −10° C. in Example 21 in Table 6, all the TMA is consumed; whereas at a higher temperature, e.g., −5° C. in this comparative example, the supernate after MAO formation contained much more TMA because a gel MAO requires TMA:water in 1:1 ratio and takes less TMA to form the gel molecules therefore 1.33:1 of TMA:water charge results in excess TMA in the supernate. Therefore, it can be concluded that at −10° C. or lower, a water loading of about 6 mmol/g silica can form majority MAO as active MAO but at −5° C., the majority MAO is gel.

Figure 10A:
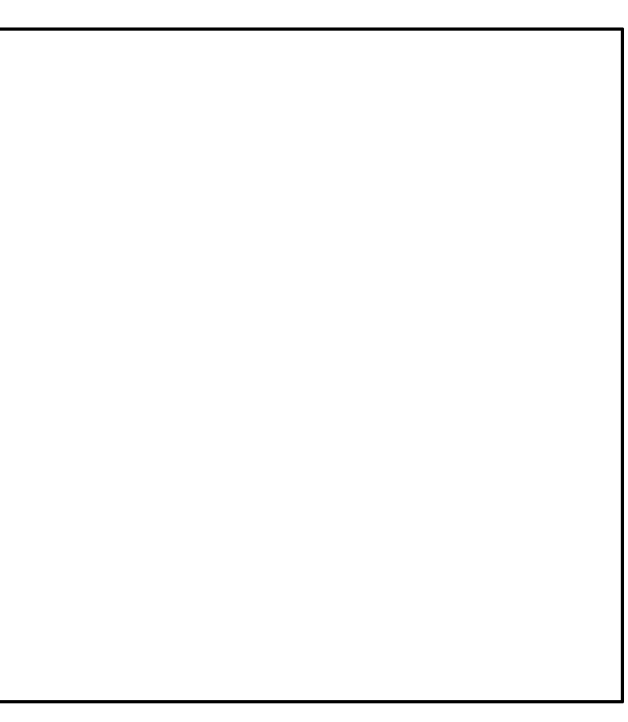
FIGS. 10a and 10b depicts 6.7(a) vs. 8.9(b) (mmol watering/g silica) derived in-situ sMAO.
Figure 10B:
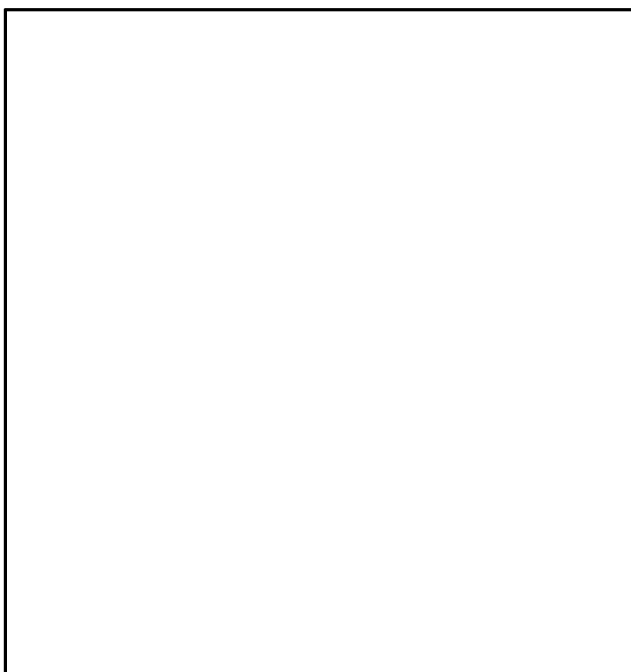
Figure 11:
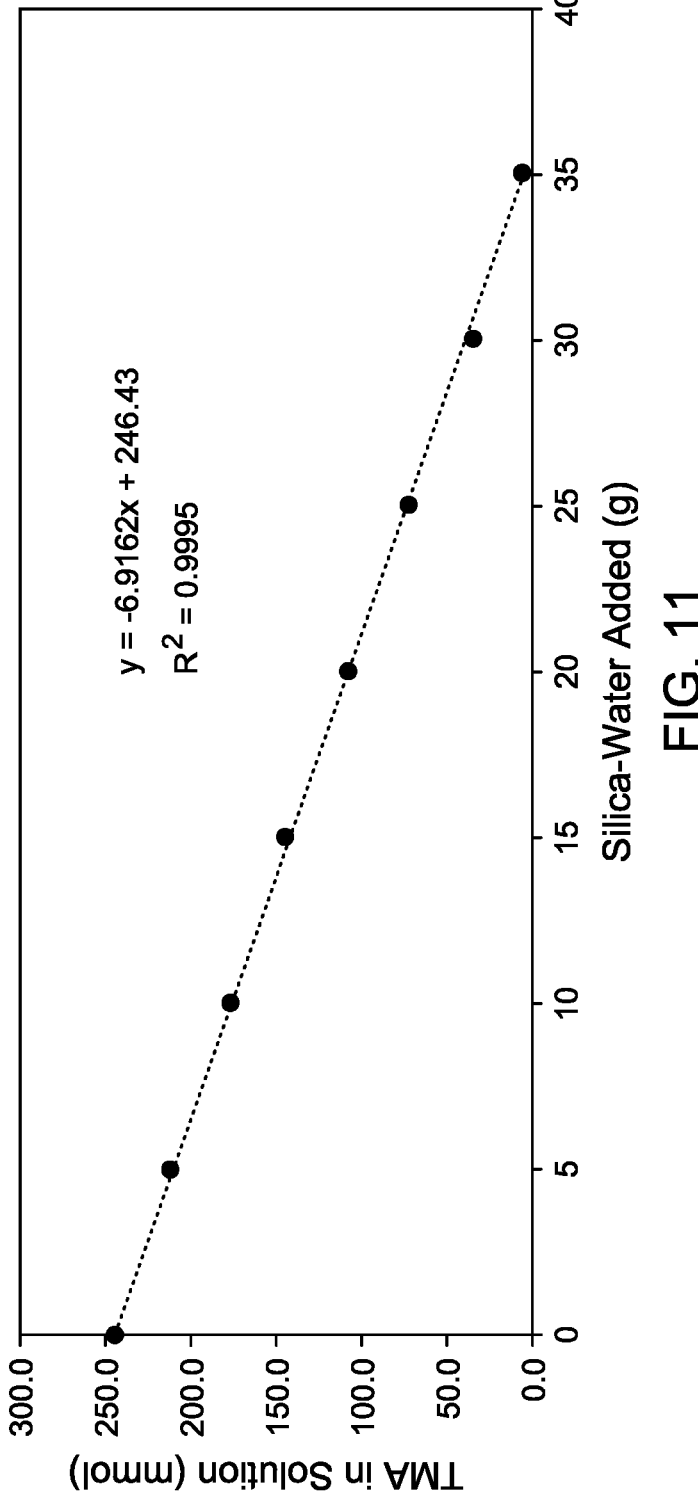
FIG. 11 depicts TMA uptake by reaction with Silica-Water in Comparative 1.

Example 24 and Comparative Example 4: Active In-Situ sMAO Water Loading Limit on Common Silica Catalyst Preparation Method IA described in Example 1-8 was used in this comparative example. Because a higher water loading was used, a smaller silica ES70 (38 μm vs. ES70X 51 μm) was the choice to reduce the chance of silica particle center local over-heating and the silica was calcined at a higher temperature 875° C. to remove most of the reactive siloxy group in silica. With a surface area around 300 m²/g, the useful water loading is in the range of 4-8 mmol water/g silica. The water loading of 8.3 (mmol/g silica) (12.8 wt % water) was intentionally used in this study to expect an MAO over fill. The TMA charge of 13.9 (mmol/g silica) to give a TMA:water ratio=1.56. 10 g ES70 (875° C.) was used to form a silica slurry with iC6. The average sMAO formation temperature was controlled at −19° C. and not over −16° C. The freshly formed sMAO was heated in isoPar E at 100° C. for 3 hours before it was mixed with M2 metallocene to make Comparative Example 4. A small sMAO sample after heating was analyzed with scanning electron microscope (SEM) and compared to Example 52a made from a similar procedure but with less water loading. The SEM images are shown in FIG. 10, a for Example 24 and b for Comparative Example 4, respectively. The catalyst was tested with salt-bed gas-phase ethylene polymerization using Poly Ib procedure described in Polymerization Test section, and the results are compared with results from M2 on an in-situ sMAO with a lower water loading but with similar heating treatment in Table 8.

temperature, such as 40-60° C. to allow the water to distribute evenly in the silica pours, which can then be mixed with a solvent to form the slurry, at cold or at ambient, and immediately added to the cold TMA solution using the Catalyst Preparation Method IA or IB reactor setup.

Example 20 and 25, Catalyst Preparation Method IC (Method IC):

Wet-Silica Preparation Method 2: For Example 20, in a 2 L round bottom flask, 300 g ES70X (200) silica was charged and sealed with a rubber septum, and 27.0 g water (5.0 mmol/g silica) was injected and mixed well before it was placed in an oven set at 55° C. for 5 hours. The wet silica was cooled to ambient and mixed with 1,008 g iC6, and then transferred as 3 portions to the 600 mL jacketed reactor where the slurry was cooled to −10 to −12° C. For Example 25, similar procedure was followed but 150 g ES70 (875) silica was used with 11.61 g water (4.3 mmol/g silica).

sMAO Formation, sMAO Heating, and Finished Catalyst all followed Catalyst Preparation Method IB procedure with TMA 154 g (7.1 mmol/g silica) for Example 20 and 74.7 g (7.0 mmol/g silica)for Example 25; with solvent iC6 for Example 20 and C₇ for Example 25; with sMAO slurry

TABLE 8

Water Loading Limit Study on in-situ sMAO for Derived M2 Catalyst Activity

| ID | Poly ID | Silica | Water (mmol/g silica) | TMA (mmol/g silica) | SMAO formation T (° C.) | Activity (g/g cat/h) |
|---|---|---|---|---|---|---|
| Comparative 4 | Poly Ib | ES70 (875) | 8.9 | 13.9 | −19 | 2,903 |
| Example 24 | Poly Ib | ES70 (400) | 6.7 | 13.8 | −19 | 5,331 |

FIG. 10 shows the 8.9 (mmol water/g silica) (or 12.8% water) derived sMAO having some "skin wrapped" particles, an indication that the MAO has over filled and leaked to outside the pours to coat the silica particle surface. Although Comparative 4 has an MAO loading of 35 wt % based on yield vs. charged silica weight comparing to Example 52a that has only 25 wt % MAO, the activity of former is actually much less than the latter as Table 8 shows. This is consistent with the observation for regular MAO supportation that if over filled, the pours get plugged and metallocene molecules cannot enter to waste those active MAO molecules. This is an indication that for most of the commercial silica supports with a surface area 300 m²/g or less, the water loading should not be more than 8 mmol/g silica.

Example 25-27: Other Wet-Silica Preparation Methods

1. Wet-silica can be prepared as a slurry with a low boiling point solvent such as C₅-C₈ and cooled to a lower temperature, e.g., −10° C., to increase the slurry viscosity if needed to pass a longer distance to reach the main reactor for in-situ sMAO formation, such as Wet-Silica Preparation Method 1 described in Catalyst Preparation Method IA and IB used for Example 1-24, where the silica was mixed with a solvent first to form a slurry and water was then added and allowed to agitate for 2 hours at ambient before it was used.
2. Wet-silica can be prepared by adding water first in a close container and placed in an oven to heat to a low heating temperature 60° C. for Example 20 and 85° C. for Example 25; with M1 based on 40 μmol/g sMAO used to make the finished catalysts for both. The yield for Example 20 was 439 g with 0.58% solvent and for Example 25 was 388 g with insignificant solvent present.

3. Wet-silica can be prepared as viscous slurry by adding a viscous solvent such as Hydrobrite oil therefore the viscous slurry can be added at ambient and a slurry pump such as a Lambda Peristaltic pump can be used to meter in the wet-silica accurately. Example 26 below is one of the examples:

Example 26, Catalyst Preparation Method II (Method II)

Wet-Silica Preparation Method 3: 200 g of ES70X (200) silica was charged w/16.9 g deionized water (4.7 mmol/g silica) in a 1 L round-bottom flask, sealed with a rubber septum and taped. The flask was then weighted and recorded the number. It was then placed in an oven set at 55° C. for 5 hours. The flask was taken out of the oven ad cooled to ambient. The weight was recorded again and compared to the weight before going into the oven to make sure no significant water escaping.

sMAO Formation and Heating: 43.38 g of the wet-silica above was loaded into a beaker containing 170 g Hydrobrite oil and mixed well with a spatula. The slurry was then added through the Lambda Peristaltic pump to the 4 L jacketed filter reactor containing 1 L isohexane (~660 g) and 20.2 g TMA (6.46 mmol/g silica) that had been cooled to −12° C. The addition rate was so controlled that the reaction mass temperature was not going over −8° C. After the addition of the wet-silica slurry, the reactor temperature was brought up to 1° C. and kept for 30 minutes, then to 60° C. and kept for 3 hours, and then cooled to ambient. The slurry was filtered and washed several times with isohexane to remove the Hydrobrite oil.

Finished Catalyst followed Catalyst Preparation Method IB with M1 based on 40 μmol/g sMAO used to make the finished catalyst. Yield: 52.0 g.

4. Wet-silica can be added as a solid through a solid pump such as a Lambda solid dozer to meter in the wet-silica accurately. Example 27 below is one of the examples.

Example 27, Catalyst Preparation Method III (Method III)

Wet-Silica Preparation Method 4 (solid addition): 40 g of ES70X (200) silica was charged w/ 3.24 g deionized water (4.5 mmol/g silica) in a 250 mL round-bottom flask, sealed with a rubber septum and taped. The flask was then weighted and recorded the number. It was then placed in an oven set at 55° C. for 5 hours. The flask was taken out of the oven ad cooled to ambient. The weight was recorded again and compared to the weight before going into the oven to make sure no significant water escaping.

sMAO Formation and Heating: The heat treated wet-silica solid was then loaded in the Lambda solid doser and added to the 4 L jacketed filter reactor containing 800 g isohexane and 19.2 g TMA (6.7 mmol/g silica) that had been cooled to −12° C. The addition rate was so controlled that the reaction mass temperature was not going over −8° C. After the addition of the wet-silica slurry, the reactor temperature was brought up to 1° C. and kept for 30 minutes, then to 60° C. and kept for 3 hours, and then cooled to ambient and placed overnight. The slurry was then filtered and dried under vacuum for 5 hours. Yield: 57 g.

Finished Catalyst: In a 20 mL vial were charged 1 g of sMAO from ii), 4.0 g of isohexane, and 17 mg neat M1 (40 μmol Zr/g) and put on a shaker to shake at ambient for 2 hours. The slurry was then filtered and dried under vacuum for 30 minutes. Yield 1.0 g.

The Example 25-27 produced catalysts were analyzed with XPS Al/Si$_{u-c}$, tested with Poly Ia polymerization and the results are summarized in Table 9.

TABLE 9

| | | | | | | sMAO | Poly Ia |
|---|---|---|---|---|---|---|---|
| | Cat Prep | Silica | Water | TMA | XPS | treatment | Activity |
| Cat ID | Method | (Calc'd T ° C.) | (mmol/g silica) | | Al/Si$_{u-c}$ | (° C./hr) | (g/g cat/hr) |
| Reference I | Reference I | G948 (600) | 4.3 (O) | 6.4 (Al) | <3 | N/A | 2,912 |
| Example 6 | Method IA | ES70X (200) | 4.3 | 7.0 | 2.56 | 85/4 | 3,764 |
| Example 19 | Method IB | ES70X (200) | 5.0 | 7.5 | 1.50 | 60/4 | 3,732 |
| Example 25 | Method IC | ES70 (875) | 5.0 | 7.1 | 1.45 | 60/4 | 3,412 |
| Example 26 | Method II | ES70X (200) | 4.7 | 6.5 | 1.64 | 60/3 | 2,529 |
| Example 27 | Method III | ES70X (200) | 4.5 | 6.7 | 2.25 | 60/3 | 3,559 |

Comparisons of M1 on In-Situ sMAO from Different Preparation Method

Example 15, 16, 19, 20, 28-59: Catalyst Activity/Resin Bulk Density Tuning Through Component Ratio and Formation Condition Variations Catalyst preparation methods, the water loading, TMA charge, water to TMA ratio, the sMAO formation temperature and heating temperature, etc. can influence the catalyst performance including the activity, the polymerization reactor operability, the polymer properties especially CDs and resin bulk density, etc. For example, if a higher activity is required for a catalyst system, the MAO loading (corresponding to water and TMA loading) can be increased, but at the same time the reaction temperature and/or the wet-silica addition rate should be decreased to maintain the sMAO product with active sMAO as the major product and limit the formation of MAO gel. A lower temperature calcined silica can benefit the catalyst operability under slurry polymerization conditions but the TMA consumption is slightly higher due to more surface hydroxyl to react with TMA. The TMA amount to silica amount can be so controlled that the TMA residue left in the supernate is undetectable to benefit catalyst production process but the activity may reduce due to a lack of TMA to form active sMAO at the end of the wet-silica addition that produces a portion of sMAO with much lower activities; an MAO loading increase may be needed to compensate the activity reduction. The examples below show the activity changes with component ratio and formation condition variations.

Pilot trials for in-situ sMAO derived M1 catalyst used in both small gas-phase PE reactor R125 and large gas-phase PE reactor R122 were performed to evaluate the different catalyst preparation techniques (Method 1B and Method 1C) to make in-situ sMAO formed from different conditions including different water loadings, TMA:water ratios, sMAO formation temperatures, solvent effects, etc. The details of starting materials and polymerization results are summarized in Table 10 and Table 11 both from Catalyst Preparation Method 1B but with Poly IV and Poly III polymerization procedures, respectively. Because Method 1B and 1C derived catalysts have shown no significant differences, they can be used interchangeably and are not provide in the tables below.

TABLE 10

| Cat ID | Silica (Calc'd T ° C.) | Water (mmol/g silica) | TMA | TMA/water | Activity (g/g cat/hr) | Resin BD (g/cc) |
|---|---|---|---|---|---|---|
| Reference I | G948 (600) | | | | 4,235.02 | 0.4220 |
| Example 19 | ES70X (200) | 5.0 | 7.5 | 1.50 | 4,774.10 | 0.4171 |
| | | | | | 4,845.12 | 0.4160 |
| Example 20 | ES70X (200) | 5.0 | 7.1 | 1.42 | 4,538.65 | 0.3903 |
| | | | | | 4,108.06 | 0.3865 |
| Example 28 | ES70X (200) | 4.7 | 6.8 | 1.45 | 3,298.74 | 0.4375 |
| | | | | | 3,825.91 | 0.4376 |
| Example 29 | ES70X (200) | 4.7 | 6.8 | 1.45 | 3,552.78 | 0.4543 |
| | | | | | 3,896.07 | 0.4673 |
| Reference I | G948 (600) | | | | 4,427.8 | 0.4033 |
| Example 30 | ES70 (875) | 4.8 | 6.6 | 1.38 | 2,940.0 | 0.4502 |
| | | | | | 2,965.0 | 0.4493 |
| Example 31 | ES70 (875) | 5.4 | 7.0 | 1.30 | 3,071.1 | 0.4608 |
| | | | | | 3,174.4 | 0.4616 |
| Reference I | Grace 948 (600) | | | | 3,671.7 | 0.4296 |
| Example 21 | ES70 (875) | 6.0 | 8.2 | 1.37 | 4,675.4 | 0.3578 |
| | | | | | 4,058.5 | 0.3600 |
| | | | | | 6,425.4 | 0.3614 |

*Pilot R122 Activity Data of M1 Catalyst Supported on in-situ vs. Regular sMAO (Reference I) from Poly IV polymerization test.*

Table 10 data are arranged from most recent descending to earlier results with the Reference I activity and bulk density set as the targets to achieve, with each group separated with a double line. It show the gradual improvement from Example 21 that gave excellent activities but significantly poorer bulk densities, to Example 30-31 that gave excellent bulk density but significantly poorer activities, to Example 28-29 that approached the targeted activities and bulk densities, and to Example 19-20 that gave better activities with very close bulk densities, which are highly desired.

TABLE 11

Pilot R125 Activity Data of M1 Catalyst Supported on in-situ vs. Regular sMAO (Reference I) from Poly III polymerization test.

| Cat ID | Silica (Calc'd T ° C.) | Water (mmol/g silica) | TMA (mmol/g silica) | TMA/water | Activity (g/g cat/hr) | Resin BD (g/cc) |
|---|---|---|---|---|---|---|
| Example 32 | ES70X (200) | 5.0 | 7.6 | 1.52 | 2,809 | 0.3701 |
| Reference I | Grace 948 (600) | | | | 1,420 | 0.3826 |
| Example 33 | ES70X (200) | 4.9 | 6.4 | 1.31 | 1,560 | 0.3456 |
| Example 34 | ES70X (200) | 4.9 | 6.6 | 1.35 | 1,392 | 0.3628 |
| Example 35 | ES70X (200) | 4.8 | 6.1 | 1.27 | 1,498 | 0.3722 |
| Reference I | Grace 948 (600) | | | | 1,486 | 0.3944 |
| Example 36 | ES70 (875) | 4.3 | 7.2 | 1.67 | 1,348 | 0.3922 |
| Example 37 | ES70 (875) | 4.3 | 7.0 | 1.63 | 1,824 | 0.4084 |
| Reference I | Grace 948 (600) | | | | 1,271 | 0.3463 |
| Example 38 | ES70X (200) | 5.9 | 8.0 | 1.36 | 1,996 | 0.2611 |
| Example 39 | Grace 948 (600) | 5.0 | 6.9 | 1.38 | 1,308 | 0.2826 |
| Reference I | Grace 948 (600) | | | | 1,669 | 0.3426 |
| Example 40 | ES70X (200) | 6.0 | 8.3 | 1.38 | 2,486 | 0.3769 |
| Reference I | Grace 948 (600) | | | | 1,241 | 0.3612 |
| Example 41 | ES70X (200) | 6.0 | 8.7 | 1.45 | 2,804 | 0.3550 |
| Reference I | Grace 948 (600) | | | | 1,522 | 0.3403 |
| Example 42 | ES70X (200) | 7.2 | 13.8 | 1.91 | Too hot | |
| Reference I | Grace 948 (600) | | | | 2,046 | 0.3389 |

Table 11 data are also arranged from most recent descending to earlier results with the Reference I activity and bulk density set as the targets to achieve, with each group separated with a double line. It show the gradual improvement from Example 42 that gave a too high activity that fouled the reactor with very high water and TMA levels, to Example 40-41 that gave both excellent activities and bulk densities with still significantly higher TMA (8.3-8.7 mmol Al/g silica) vs. Reference I (6.4 mmol Al/g silica), to Example 38-39 with reduced TMA and water amounts that gave the targeted activities but poorer bulk densities, and to Example 19-20 that gave better activities with very close bulk densities, which are highly desired.

In-situ sMAO derived bridging zirconocene M3 was tested in the lab 2 L salt bed reactor polymerization and pilot trials in both small gas-phase PE reactor R125 and large gas-phase PE reactor R122 to evaluate the catalyst preparation from devices described in (Method 1B and Method IC) except Example 48 that was from Method III. The details of starting materials and polymerization results are summarized in Table 12 and Table 13.

TABLE 12

Lab 2L Polymerization Results for In-Situ sMAO Derived M3

| Cat ID | Poly ID | Silica (Calc'd T ° C.) | Water (mmol/g silica) | TMA (mmol/g silica) | TMA/ water | Activity (g/g cat/hr) |
|---|---|---|---|---|---|---|
| Example 43 | Poly Ia | ES70 (400) | 8.2 | 13.8 | 1.68 | 5,227 |
| Example 44 | Poly Ia | ES70X (200) | 7.4 | 11 | 1.49 | 5,613 |
| Example 45 | Poly Ia | ES70X (200) | 6.0 | 8.2 | 1.37 | 6,735 |
| Example 46 | Poly Ia | ES70 (875) | 5.0 | 7.1 | 1.42 | 3,587 |
| Example 47 | Poly Ia | ES70X (200) | 5.0 | 7.5 | 1.49 | 3,583 |
| Example 48 | Poly Ia | ES70X (200) | 4.5 | 6.7 | 1.49 | 5,468 |
| Reference III | Poly Ia | G948 (600) | 4.3 (O) | 6.4 (Al) | 1.49 | 3,522 |

*Example 48 was made from Method III

The lab 2 L reactor polymerization data in Table 12 again show the activity relationship with MAO loading determined by the water loading on silica: the higher the more activity. However, the activity reached a limit when the MAO loading approaches the silica MAO loading limit, which is actually decreased presumably due to pour fully filled with MAO and can no longer taking catalyst or blocking monomer to move in, indicating that the water loading for the ES70X silica or the like with a 300 m$^2$/g surface area has a highest activity limit for water loading, e.g., about 6-7 mmol/g silica (Example 45). The high activity at 6 mmol/g silica water load (Example 45) caused the pilot gas-phase polymerization fouling due to a too hot polymerization that melt the resins. The M3 metallocene is therefore built on 4-5 mmol water/g silica to have an activity in control. Table 13 below shows the small and large pilot results from catalysts with a lower water loading.

TABLE 13

| | | | | | | | |
|---|---|---|---|---|---|---|---|
| | | Pilot R125 and R122 Polymerization Results for in-situ sMAO Derived M3 | | | | | |
| Cat ID | Poly ID | Silica (Calc'd T ° C.) | Water | TMA | TMA/ water | Activity (g/g cat/hr) | Resin BD (g/cc) |
| | | | (mmol/g silica) | | | | |
| Example 49* | Poly III | ES70X (200) | 5.0 | 7.1 | 1.42 | 1,910 | 0.3579 |
| Example 50* | Poly III | ES70X (200) | 5.0 | 7.6 | 1.52 | 1,200 | 0.3614 |
| Reference III | Poly III | G948 (600) | 4.3 (O) | 6.4 (MAO) | 1.49 | 1,114 | 0.4085 |
| Example 51 | Poly IV | ES70X (200) | 5.0 | 7.5 | 1.50 | 3,130 | 0.4827 |
| Reference III | Poly IV | G948 (600) | 4.3 (O) | 6.4 (MAO) | 1.49 | 3,339 | 0.4683 |

*M3 dichloride (Example 50) and dimethyl (Example 49) were compared.

Data in Table 13 show that either a higher bulk density with comparable activity vs. standard (Example 51) or a higher activity with a close bulk density (Example 49) can be achieved by adjust the TMA to water ratio and/or the use of an alkylated metallocene.

In-situ sMAO derived hafnocene M2 catalysts were tested in the lab 2 L salt bed reactor and pilot trials in both small gas-phase PE reactor R125 and large gas-phase PE reactor R122 to evaluate the catalyst preparation from devices described in (Method 1B or IC) to make in-situ sMAO formed from different conditions including different water loadings, TMA:water ratios, sMAO formation temperatures, solvent effects, etc. The details of starting materials and polymerization results are summarized in Table 14 and Table 15. M2 was sensitive to heating temperature and the presence of free TMA.

TABLE 14

| | | | | | | | |
|---|---|---|---|---|---|---|---|
| | | Lab 2L Polymerization Results for in-situ sMAO vs. Reference sMAO Derived M2 | | | | | |
| Cat ID | Poly ID | Silica (Calc'd T ° C.) | Water | TMA | TMA/ water | sMAO Heating (° C.) | Activity (g/g cat/hr) |
| | | | (mmol/g silica) | | | | |
| | | The data below used MAO treated silica as scavenger | | | | | |
| Example 52 | Poly Ib | ES70 (200) | 7.2 | 13.8 | 1.92 | 100 as solid | 8,878 |
| Reference II | Poly Ib | ES70 (875) | 4.3 (O) | 6.4 (Al) | 1.49 | — | 6,991 |
| | | The data below used TIBAL treated silica as scavenger | | | | | |
| Example 53 | Poly Ib | ES70X (200) | 7.3 | 11.0 | 1.51 | 105 in C8 | 6,676 |
| Example | Poly Ib | ES70 (400) | 6.7 | 13.8 | 2.06 | 100 as solid | 5,331 |
| Example 23 | Poly Ib | ES70X (200) | 6.0 | 8.0 | 1.33 | 60 in iC6 | 3,854 |
| Example 54 | Poly Ib | ES70X (200) | 5.4 | 7.6 | 1.41 | 60 in iC6 | 4,218 |
| Example 55 | Poly Ib | ES70X (200) | 5.0 | 7.5 | 1.50 | 60 in iC6 | 2,729 |
| Reference II | Poly Ib | ES70 (875) | 4.3 (O) | 6.4 (Al) | 1.49 | — | 6,198 |

TABLE 15

| | | | | | | | |
|---|---|---|---|---|---|---|---|
| | | Pilot R125 and R122 Polymerization Results for in-situ sMAO Derived M2 | | | | | |
| Cat ID | Silica (Calc'd T ° C.) | Water (mmol/g silica) | TMA | TMA/ water | sMAO Heating (° C.) | Activity (g/g cat/hr) | Resin BD (g/cc) |
| | | From Poly IV procedure for R122 reactor | | | | | |
| Example 15 | ES70 (400) | 6.5 | 8.5 | 1.31 | 100 solid | 5,833 | 0.4328 |
| Example 16 | ES70X (200) | 6.5 | 8.5 | 1.31 | 85 in C7 | 5,198 | 0.4493 |
| Reference II | ES70 (875) | 4.3 (O) | 6.4 (Al) | 1.49 | NA | 5,752 | 0.4649 |
| | | From Poly III for R125 reactor | | | | | |
| Example 56 | ES70X (200) | 5.4 | 7.6 | 1.41 | 60 in iC6 | 2,025 | 0.4348 |
| Reference II | ES70 (875) | 4.3 (O) | 6.4 (Al) | 1.49 | NA | 3,539 | 0.4557 |
| Example 57 | ES70 (400) | 7.8 | 13.8 | 1.77 | 40 in iC6 | 1,459 | 0.3353 |
| Reference II | ES70 (875) | 4.3 (O) | 6.4 (Al) | 1.49 | NA | 2,616 | 0.4010 |

Again from Table 14 and 15, it can be seen that increasing water loading and TMA to water ratio in general can increase the M2 activities. However, heating play a much more critical role for the activity improvement (Table 14 from 55 up to 52). R125 results show a that the high water load (Example 57, 7.8 mmol/g) resulted in low a bulk density and a poor activity, very likely a result of partial pore over filled that generates dead spot for polymer growth and a lower heating temperature not enough to enlarge MAO size. The optimized recipe is Example 15 where a lower water loading was used and the sMAO was heated at much higher temperature (100° C.) to match both the activity and bulk density with the standard target (Reference II).

In general, based on the data in Tables 14 and 15, increasing the MAO loading does not appreciably increase the activity of hafnocene M2; rather, heat increases the activity of the catalyst more efficiently. Also, from Tables 10 to 15, it was observed that silica from high to low calcination temperature can be used to obtain desired activities, although a different calcination temperature may provide different benefits for different catalysts applied in different polymerization processes. The activity was tunable by changing the amount of water and the TMA to water ratio. The TMA/water ratio was also controlled so that the TMA and soluble MAO residue in the supemate after sMAO formation reaction was undetectable by NMR, see e.g., Example 31 or 21 in Table 10 where the TMA: water ratio was about 1.3:1.

This data also shows that a high MAO loading may be required for more efficient activation of certain catalyst systems; for example, a metallocene bearing very sterically incumbent ligand(s), e.g., the PP metallocene M4 described in a later section, usually result in a low activation efficiency that requires more MAO to activate the majority of the molecules to obtain a desired activity. Another example is the polymerization condition changes to obtain desired polymer properties such as in the HDPE case where the comonomer concentration is much lower that results in a low activity not operationally desired. A higher MAO loading and higher catalyst precursor loading may increase the activity to satisfy the desired operation activity.

From this, it has been learned that although silica with a higher surface area can hold a higher MAO loading without overfilling the pores, other factors should also be considered for an operable catalyst system. For example, the increase of surface area may need to reduce the pore diameter to maintain the silica wall thickness for a desired mechanical strength. Yet the reduction of pore diameter is limited due to an MAO molecule's incapability to enter pores with diameters about 50 angstrom or smaller. The pore space after MAO supportation should be large enough for a catalyst precursor to enter and also allow monomers (especially large comonomers) to come in freely to prevent mass transfer limit.

Example 58—High Water Loading on High Surface Area Silica

In-Situ sMAO Preparation: Catalyst Preparation Method IA was used for this preparation except 20 g silica (PD14024, 611 m2/g surface area, 85 mm average particle size, 1.40 cc/g pore volume, 600° C. calcined, from PQ Corporation) with 2.88 g water (8.0 mmol/g silica) and 72 g iC6 were used to form the wet-silica slurry, which was cooled to −10° C. and added to −10° C. TMA solution (16.4 g (11.4 mmol/g silica) with 400 g iC6). The freshly formed sMAO was heated at 60° C. for 3 hours and then cooled to ambient. The solid was isolated by filtering, washing with iC6, and drying overnight. Yield: 32 g.

Solid Catalyst Preparation: Added 0.0145 g M4 (947 g/mol) into the sMAO slurry of 1.0 g sMAO from above and 5 g iC6 in a 20 mL vial that had been pre-treated with 0.06 g neat TIBAL for 30 minutes at ambient; Placed the vial on a shaker to shake for 2 hours; Filtered and dried for 30 minutes; Yield: 1.02 g.

Catalyst Slurry Preparation: Added 19.0 g dried mineral oil (degas under $N_2$ at 105° C. 2 hours) and 1.02 g catalyst in a 2 Oz crimp top bottle to make a 5.0 wt % slurry.

Sequential Polymerization: See Poly VI

Example 59: Polymer Resin Bulk Density Studies

Resin bulk density is another important product property related to operability (e.g., particle flowability in a gas-phase polymerization reactor) and packaging volume. A higher BD is desired and can be achieved mainly through two controls: the water distribution on silica and sMAO formation conditions from the catalyst preparation part, although a good polymerization process in the polymerization reactor and the use of a continuity agent can also contribute to BD, e.g., a more evenly distributed water and smoother silica slurry addition at a lower temperature with more diluted TMA solution result in a higher BD. A practical combination of these factors can allow to obtain the products with desired BD, i.e., similar or better than the commercial standard.

It can be understood that a water distribution can result in a good MAO distribution in the silica pores therefore when the polymer growth to replicate the structure of the silica, the dead spots (no Al) that generate voids (therefore reduce the bulk density) will be limited. However, even the Al distribution is good, a dead spot may also be generated if the local heat is high enough to convert the active MAO to the inactive MAO gel. Therefore, the control of a smooth addition of wet-silica into the TMA solution at cold is as important as the water distribution on silica.

Figure 4:
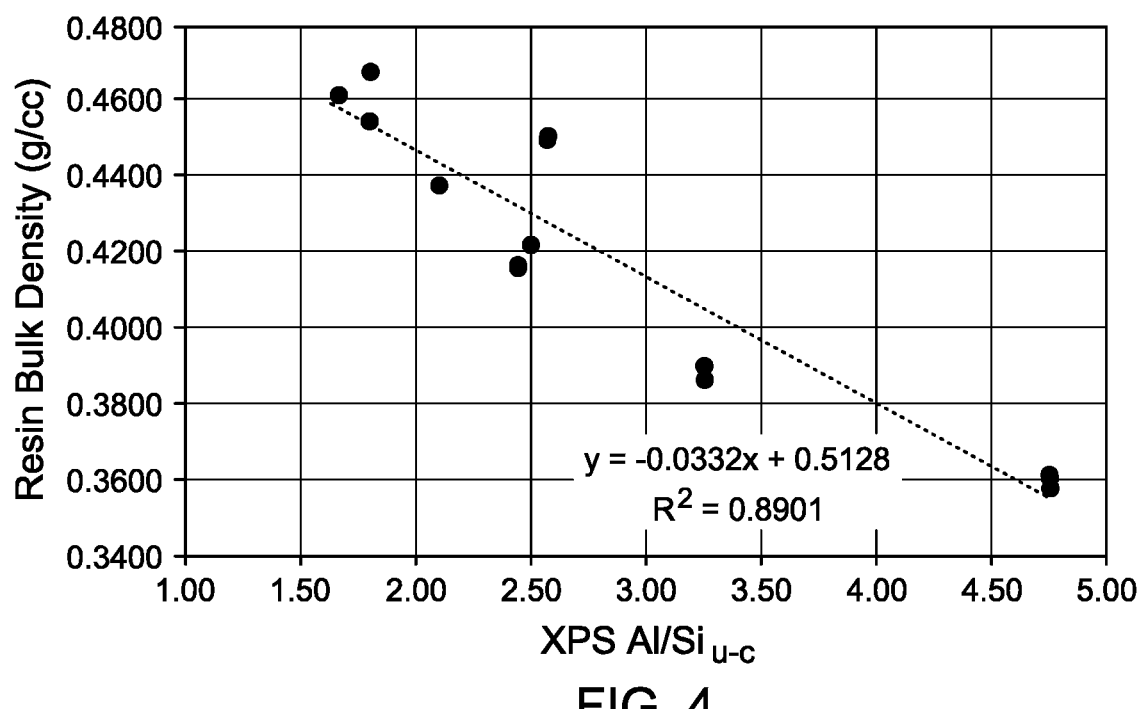
FIG. 4 depicts the relationship of resin bulk density vs XPS in Pilot R122 trials.
Figure 5:
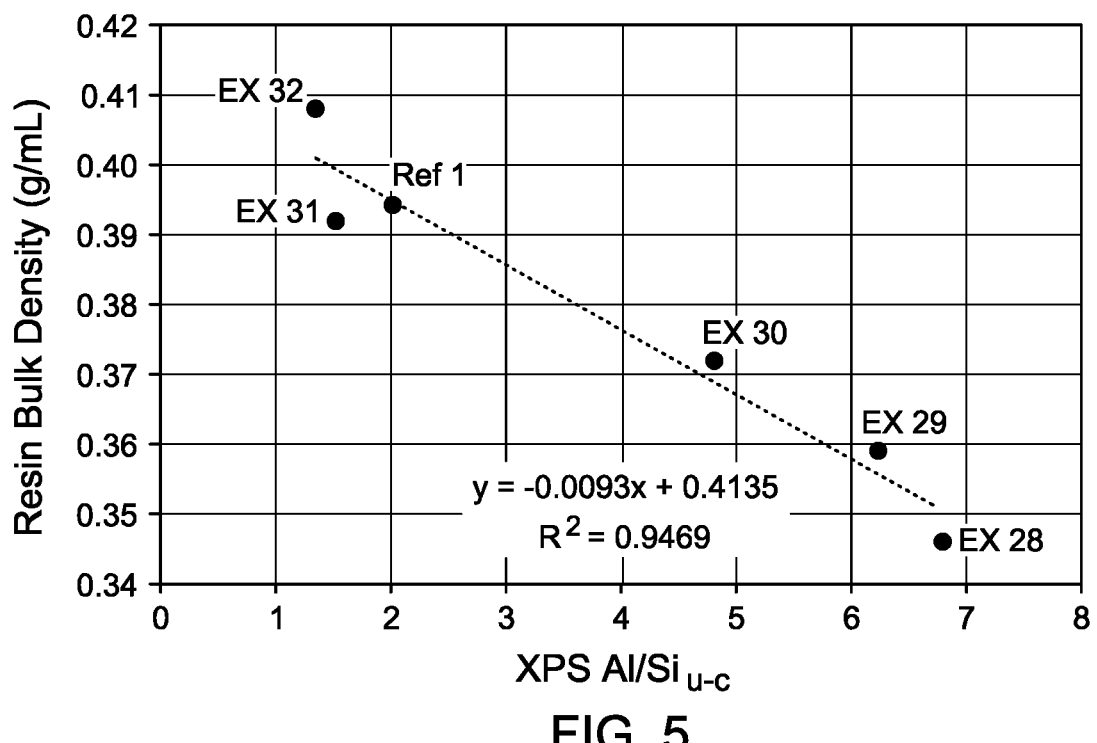
FIG. 5 depicts the relationship of resin bulk density vs XPS in Pilot R125 trials.

XPS uncrushed to crushed Al/Si ratio measurement was able to predict the bulk density before the polymerization was run, a good QC tool to qualify the catalyst quality. A series of catalysts based on M1 metallocene on different in-situ sMAO were made under different conditions and were tested in the pilot reactors R122 using the polymerization procedure Poly IV and R125 using the polymerization procedure Poly III, and the results are summarized in Tables 16 and 17, FIGS. 4 and 5, along with the regular sMAO standard (Reference I).

TABLE 16

| Pilot R122 Results | | | |
| --- | --- | --- | --- |
| BD Data Source | Poly ID | XPS Al/Si$_{u-c}$ | BD (g/cc) |
| Reference I | Poly IV | 2.50 | 0.4220 |
| Example 19 | Poly IV | 2.44 | 0.4171 |
| | Poly IV | 2.44 | 0.4160 |
| Example 20 | Poly IV | 3.25 | 0.3903 |
| | Poly IV | 3.25 | 0.3865 |
| Example 28 | Poly IV | 2.10 | 0.4375 |
| | Poly IV | 2.10 | 0.4376 |
| Example 29 | Poly IV | 1.80 | 0.4543 |
| | Poly IV | 1.80 | 0.4673 |

TABLE 16-continued

| Pilot R122 Results | | | |
| --- | --- | --- | --- |
| BD Data Source | Poly ID | XPS Al/Si$_{u-c}$ | BD (g/cc) |
| Reference I | Poly IV | | 0.4033 |
| Example 30 | Poly IV | 2.57 | 0.4502 |
| | Poly IV | 2.57 | 0.4493 |
| Example 31 | Poly IV | 1.66 | 0.4608 |
| | Poly IV | 1.66 | 0.4616 |
| Reference I | Poly IV | | 0.4296 |
| Example 21 | Poly IV | 4.75 | 0.3578 |
| | Poly IV | 4.75 | 0.3600 |
| | Poly IV | 4.75 | 0.3614 |

TABLE 17

| Pilot R125 Results | | | |
| --- | --- | --- | --- |
| BD Data Source | Poly ID | XPS Al/Si$_{u-c}$ | BD (g/cc) |
| Reference I | Poly III | 2.00 | 0.3944 |
| Example 32 | Poly III | 6.78 | 0.3456 |
| Example 33 | Poly III | 6.22 | 0.3628 |
| Example 34 | Poly III | 4.80 | 0.3744 |
| Example 35 | Poly III | 1.49 | 0.3922 |
| Example 36 | Poly III | 1.42 | 0.4082 |

Example 60: Polymer Property Reactor Control Studies

Two representative pilot reactor results based on in-situ sMAO derived M1 catalyst from Example 19 and M2 catalyst from Example 57, respectively, are compared with the results from the regular sMAO-M1 and M2 catalysts (Reference I and II) in Table 18 and Table 19.

TABLE 18

| Pilot R122 results from M1 on in-situ sMAO (Example 19) vs. Regular sMAO (Reference I) | | | | |
| --- | --- | --- | --- | --- |
| Catalyst ID | | Reference I | Example 19 Run 1 | Example 19 Run 2 |
| MI | g/10 min | 0.921 | 0.983 | 0.999 |
| HLMI | g/10 min | 15.11 | 15.5 | 15.7 |
| MIR | | 16.41 | 15.76 | 15.72 |
| Density | g/cm$^3$ | 0.9184 | 0.9175 | 0.9177 |
| Bed Temperature | ° F. | 185 | 185.1 | 185.1 |
| Reactor Pressure | psig | 289.7 | 288.9 | 288.8 |
| Ethylene Concentration | mol % | 65.07 | 64.95 | 65.07 |
| Ethylene Partial Pressure | psi | 198 | 197.2 | 197.5 |
| H2/C2 = Gas Ratio | ppm/mol % | 2.38 | 2.39 | 2.38 |
| H2/C2 = Flow Ratio | lb/lb | 2.65E-05 | 2.13E-05 | 2.12E-05 |
| H2 Concentration | ppm | 155.1 | 155 | 154.8 |
| C6/C2 = Gas Ratio | mol/mol | 0.0191 | 0.0174 | 0.0172 |
| C6/C2 = Flow Ratio | lb/lb | 0.086 | 0.083 | 0.083 |
| iC5 Composition | mol % | 9.77 | 7.94 | 7.9 |
| N2 Composition | mol % | 23.14 | 24.35 | 24.31 |
| Fluidized Bulk Density | lb/ft$^3$ | 9.4 | 11.5 | 11.5 |
| Settled Bulk Density | g/cm$^3$ | 0.422 | 0.4171 | 0.416 |
| Bed Weight | lb | 162.5 | 163.7 | 163.4 |
| Calculated Production Ratio | lb/hr | 46.3 | 52.9 | 53.7 |
| Measured Production Ratio | lb/hr | 43 | 30.9 | 67 |
| Drops per hour | hr$^{-1}$ | 10.7 | 12.9 | 13.4 |
| Residence Time (measure) | hr | 3.8 | 5.3 | 2.4 |
| H2 feed valve | | FC9729 | FC9729 | FC9729 |
| Slurry Feed Pump | | Dry | Dry | Dry |
| Catalyst Feed Rate | g/hr | 4.61 | 4.84 | 4.84 |
| Catalyst Feeder Efficiency | % | 100 | 104 | 104 |
| Catalyst Productivity | g/g | 4235.02 | 4774.1 | 4845.12 |
| C6/C2 Zero-vent flow ratio | lb/lb | 0.096 | 0.089 | 0.09 |
| C6/C2 incorporated | lb/lb | 0.086 | 0.08 | 0.081 |
| H2/C2 Zero-vent flow ratio | lb/lb | 2.96E-05 | 2.21E-05 | 2.20E-05 |

Table 18 results show that, with a slightly higher MAO loading based on oxygen (from water) in MAO, i.e., 5 mmol/g vs. regular sMAO 4.3 mmol/g, the in-situ sMAO derived M1 displays about 14% higher productivity in either a longer or a shorter residence time, yet the desired polymer properties such as 1.0 MI, 16 MIR, and 0.918 density can be achieved to match the standard regular sMAO version through the adjustment of the feed controls such as $H_2$ to $C_2$ and $C_6$ to $C_2$ ratios, flow ratios and inert component controls such as $N_2$ and iC5 compositions. One of the representative pilot R125 run summary on M2 metallocene is as follows:

TABLE 19

| Pilot R125 results from M2 on in-situ sMAO vs. Regular sMAO | | |
|---|---|---|
| | Cat ID-R125 Run ID | |
| | Reference II-Poly III | Example 57-Poly III Catalyst |
| | M2 regular sMAO | M2 in-situ sMAO |
| $H_2/C_2$ Ratio (ppm/mol) | 4.9 | 5.0 |
| $C_6/C_2$ Ratio (mol/mol) | 0.017 | 0.017 |
| $C_2$ conc. (mol %) | 69.9 | 69.9 |
| Residence Time (hr) | 4.7 | 5.2 |
| Melt Index (MI) | 1.05 | 1.12 |
| HLMI/MI Ratio (MIR) | 26.62 | 25.63 |
| Density | 0.9200 | 0.9205 |
| Bulk Density | 0.4010 | 0.3746 |

Temp = 175° F. (79° C.), P = 300 psig

Figure 6:
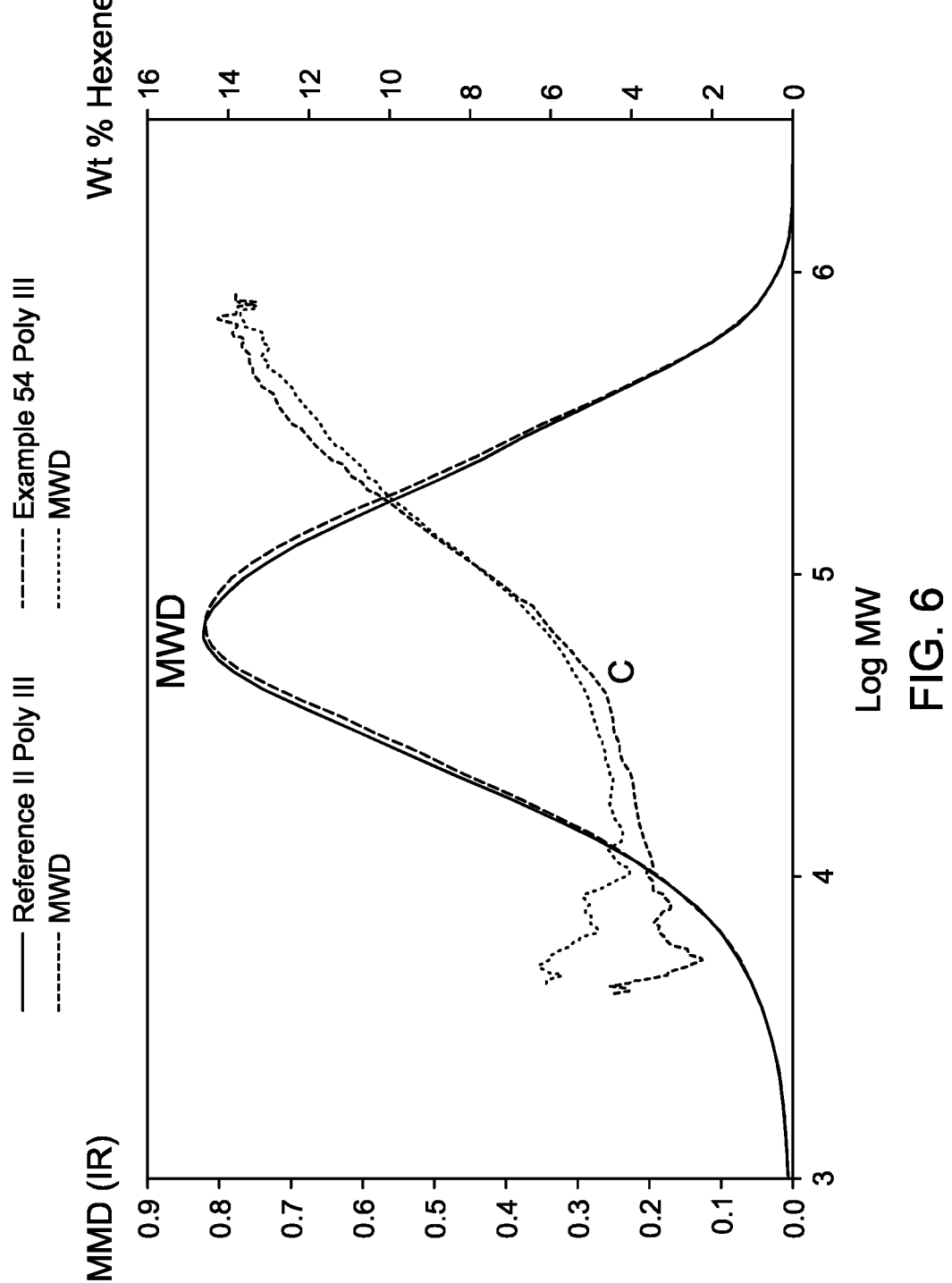
FIG. 6 depicts the CDs from M2 in-situ sMAO vs. regular sMAO derived polymer MWD and 1-Hexene Distribution (CD).

Table 19 shows that the desired MI of near 1 and polymer density of 0.92 can be achieved with desire MIR of near 26 through the adjustment of ethylene ($C_2$) concentration, $H_2/C_2$ ratio and comonomer (here 1-hexene, $C_6$)/$C_2$ ratio. The product CD also shows excellent similarity to the regular sMAO catalyst derived polymer as shown in FIG. 6.

Example 61-68: Slurry Polymerization Catalysts Including iPP Catalyst Preparation The catalysts used in the slurry polymerization studies were from Method IB, with variations shown in Table 20. Catalysts prepared from different temperature calcined silica and under different conditions were prepared and compared under slurry polymerization conditions to investigate MAO leaching fouling factors. The sMAO was prepared similar to Method 1B except that: 1) silica PD14024 (size: 85 μm; surface area: 611 m2/g; pore volume: 1.40 cc/g, provided by PQ Corporation) was calcined at 600° C.; 2) the water loading was 8.0 mmol water/g silica water; 3) the TMA charge was 11.4 mmol TMA/g silica; 4) reaction temperature was −20° C.; and 5) before contacting the catalyst precursor, the sMAO slurry was treated with 5 wt % TIBAL based on sMAO weight for 30 minutes. M4 was used as the catalyst precursor and charged based on 0.16 wt % Zr. The catalyst was used to polymerize homo-PP (Poly V described in Polymerization Test section). The polymerization results are shown below in Table 20.

Slurry polymerization tests were tested using Poly II procedure described in Polymerization Test section. The catalyst preparation variations and polymerization results are summarized in Table 20.

TABLE 20

| | | | | | | | | |
|---|---|---|---|---|---|---|---|---|
| Slurry polymerization results on M1 and M4 (Ex. 61) on in-situ sMAO. | | | | | | | | |
| Cat ID | Silica (Calcn' T ° C.) | sMAO Heating (° C.) | Water (mmol/g SiO₂) | Al | Catalyst Description | Yield (g) | Productivity (g/gCat/hr) | Fouling Index |
| Example 61 | PD14024 (200) | 100 | 6.0 | 8.0 | TIBAL treat, PP | 51.0 | 6,120 | 0/5 |
| Example 62 | ES70 (875) | 85 | 4.3 | 7.0 | TMA in supernate/ iC6 wash | — | Major foul | 5/5 |
| Example 63 | ES70 (875) | 85 | 4.3 | 7.0 | TMA in supernate/ Tol wash | — | Major foul | 4/5 |
| Example 64 | ES70X (200) | 60 | 6.0 | 8.0 | TMA in supernate/ no wash | 135.5 | 2029 | 1.5/5 |
| Example 65 | ES70X (200) | 60 | 6.0 | 8.0 | TMA in supernate/ Tol wash | 140.0 | 2097 | 0.5/5 |
| Example 66 | ES70X (200) | 60 | 6.0 | 8.0 | TMA in supernate/ iC6 wash | 159.2 | 2385 | 1/5 |
| Example 67 | ES70X (200) | 60 | 6.0 | 8.0 | no TMA in supernate | 242.8 | 3,639 | 0/5 |
| Example 68 | ES70X (200) | 85 | 5.0 | 7.6 | remove TMA in supernate before heat | 189.2 | 2,835 | 0/5 |

Table 20 results suggested that catalysts used for slurry polymerization (or super-condensing mode gas-phase polymerization that has a slurry polymerization like environment) requires MAO to be firmly anchored on the silica surface or agglomerate to larger insoluble molecules in the pores. Several methods can be used separately or simultaneously to support the MAO with limited MAO leaching under slurry polymerization conditions, such as using a lower calcination temperature to calcine silica that allows more surface siloxy groups as the anchor points; e.g., a 200° C. calcined ES70X has silanol group 2.2-2.6 mmol/g silica, while an 875° C. calcined one only has 0.2-0.4 mmol/g silanol, for silica with about 300 m$^2$/g surface area. >85° C. heat treatment, e.g., 100° C., can force MAO to oligomerize to form less soluble large MAO molecules. If a higher temperature calcined silica is used, e.g., to obtain desired CD, a continuity agent, such as an anti-fouling agent and/or a static electron removing agent can be used.

Another potential fouling factor leading to MAO leaching is the scavenger replacement of MAO in the slurry environment. E.g., TEAL and TIBAL are two popular scavengers for slurry polymerization. To avoid MAO leaching in the polymerization reactor, the sMAO can be treated with a scavenger at the same or higher temperature than the targeted polymerization temperature and remove replaced MAO before contacting metallocenes to make the finished catalysts.

Yet another potential fouling factor leading to reactor fouling is neutral metallocene leaching due to common incomplete activation, especially in the iPP catalyst case where sterically hindrance ligand's present resulting in low activation efficiencies. Neutral metallocene present in the system can leach out and react with the scavenger, e.g., TIBAL to form low activity species to do homogenous polymerization under slurry polymerization. The control of this kind of fouling is through the NMR activation studies on individual metallocene to determine the loaded MAO:MCN ratio in the formula.

Since we have shown operability in slurry- and gas-phase polymerization. It is therefore expected that the derived catalysts can also be used in sequential polymerization such as the setup for ICP where iPP is made in first set of slurry reactors, e.g., slurry loops, following by making EP rubber in the 2nd set of reactors, e.g., gas-phase reactors.

Example 69: CD Control Studies on Different Unanchored (Solid) MAO to Anchored MAO Ratios Except the metallocene of choice that determine the comonomer incorporation and distribution behavior, manipulating catalyst formation composition and conditions can also change the CD behaviors. A plausible hypothesis is that there are different pore depth and pore diameter in the silica that discriminate more on the mobility of a larger comonomer such as 1-hexene. MAO also presents in the pores as anchored and unanchored, with the unanchored one has better affinity of 1-hexene due to less steric hindrance vs. anchored ones. Without being bound by any theory, it can be sketched like the schematic below to help for understanding, with pink balls as unanchored and blue balls as anchored MAO:

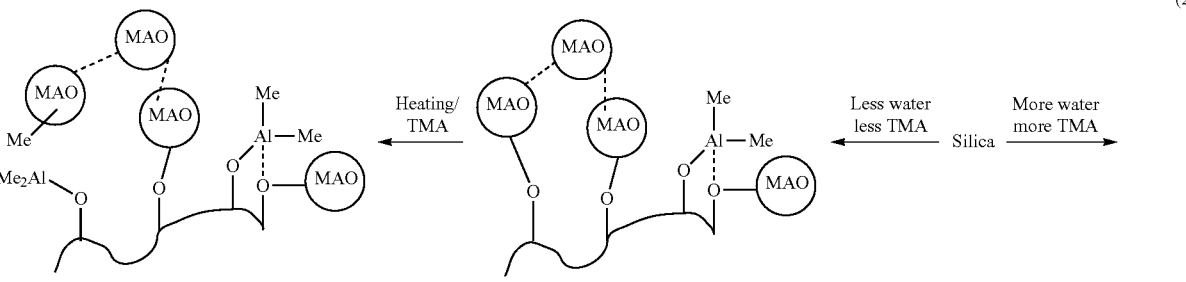

(2)

-continued

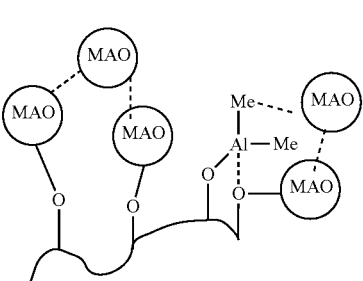

Figure 7:
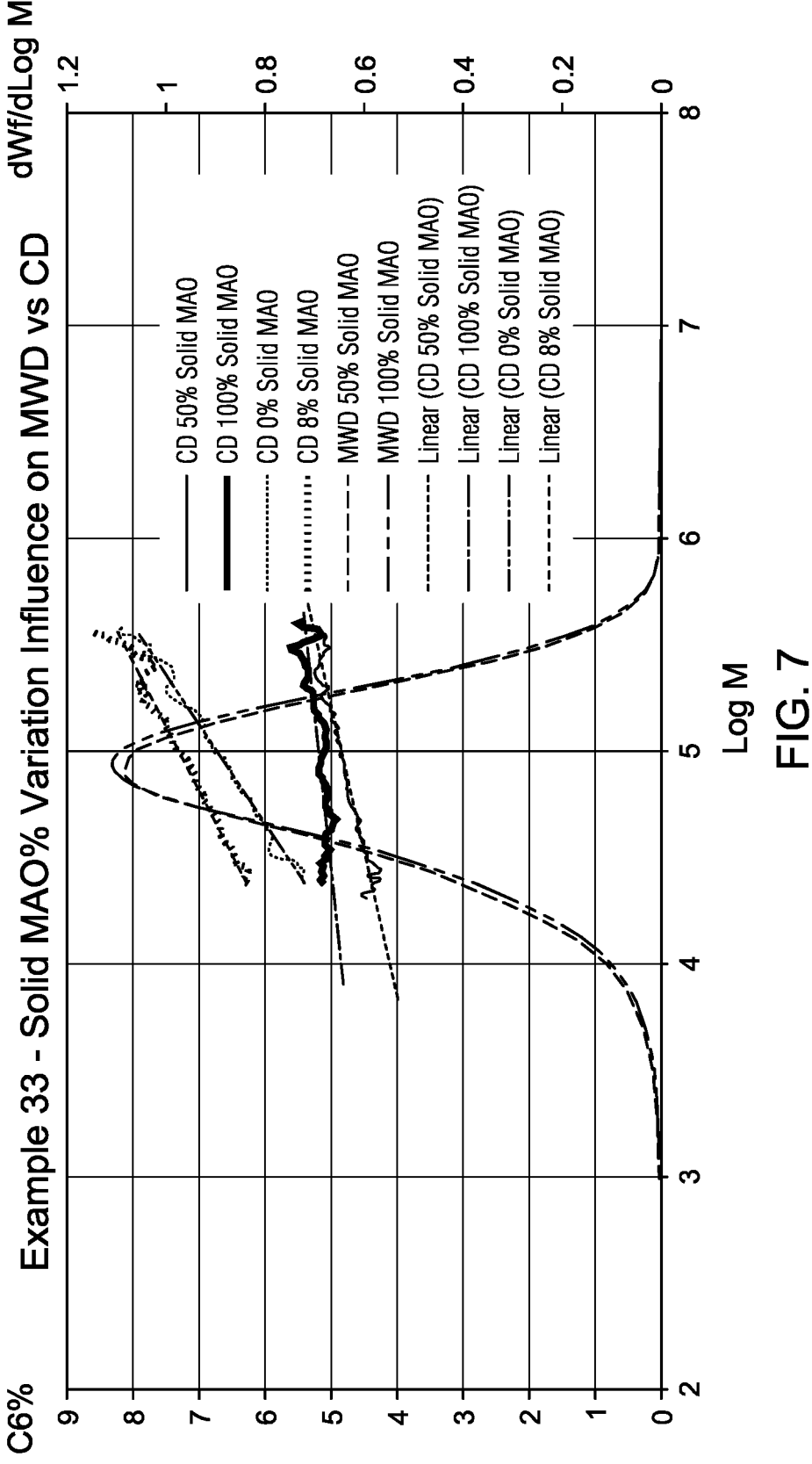
FIG. 7 depicts the CD relationship from Solid to Supported MAO Ratio as described with reference to Example 33.

A solid MAO (no support) should have significantly flatter CD due to comonomers more evenly distrusted along different molecular weight portions than the supported MAO derived polymer has. A supporting experimental example has been done by changing the solid MAO to supported MAO ratio through mixing a solid MAO with supported MAO to investigate the solid MAO effect. FIG. 7 shows the plots of solid MAO only, 8 wt % solid MAO, 50 wt % solid MAO, and 0% solid MAO derived ethylene-hexene ($C_6$) copolymerization using M1 as the catalyst precursor.

M1 on in-situ sMAO (Example 31) made from preparation Method Ib under conditions of Example 31 in Table 10 was used as 0% solid MAO base line. A Tosoh (TS) solid MAO was used to change the solid MAO to anchored MAO ratio.

100% solid MAO sample: 0.65 g TS MAO+5 g $C_7$ and 40 μmol M1 was shaken on a shaker for 15 minutes. The resulting mixture was filtered and dried under vacuum for 15 minutes. Yield: 0.64 g.

50% solid MAO sample: 0.25 g Example 31 catalyst was mixed well with 0.25 g TS MAO M1 from a.

8% solid MAO sample: 0.92 g Example 31 catalyst was mixed well with 0.080 g TS MAO M1 from a.

0% solid MAO sample: Example 31 catalyst only.

The 4 catalysts were run in a lab 2 L salt bed reactor for PE polymerization with the polymerization procedure Poly Ia. The polymer samples were then sent for GPC-4D analysis to obtain MWD and CD shown in FIG. 7. It can be seen in FIG. 7 that the CD slope becomes flatter and flatter as the solid MAO increases.

Figure 8:
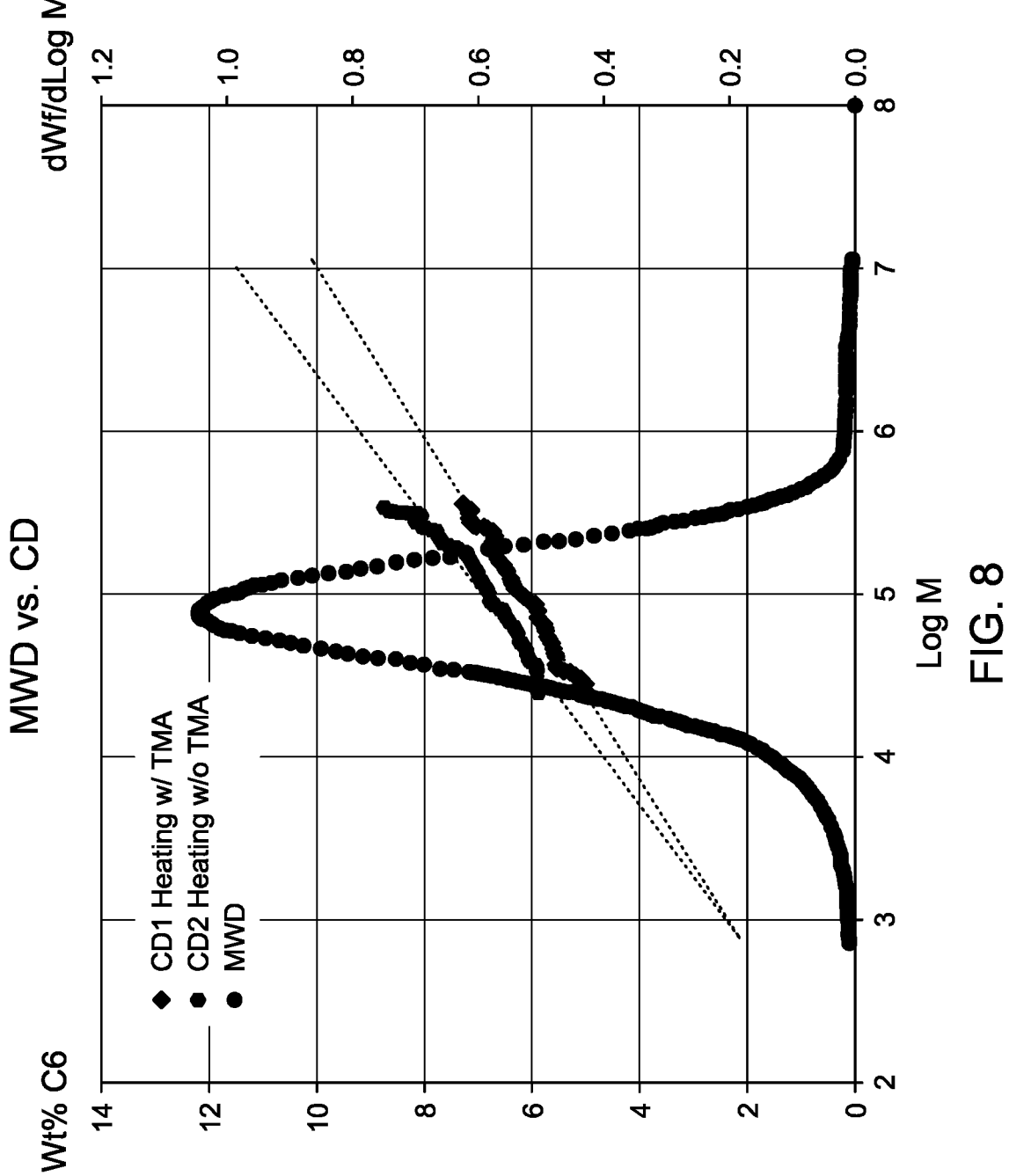
FIG. 8 depicts the CD change on polymers from M1 on in-situ sMAO heated with vs. without TMA.

The hypothesis based on Eq. 2 also suggests that anchored MAO can be unanchored through the heating with TMA, expecting the TMA molecule to replace MAO molecule on the surface, as showing in Eq. 2 to the left from b to c. And the experimental results of GPC-4D composition distribution analyses from two polymer samples obtained under similar conditions (Poly Ia), each using the catalyst derived from the same in-situ sMAO but heated with TMA (Example 2) and without TMA (Example 4), respectively, did show a CD difference (FIG. 8), i.e., the polymer from the catalyst from sMAO heated with TMA shows a flatter CD, consistent with more unanchored MAO being produced.

Figure 9:
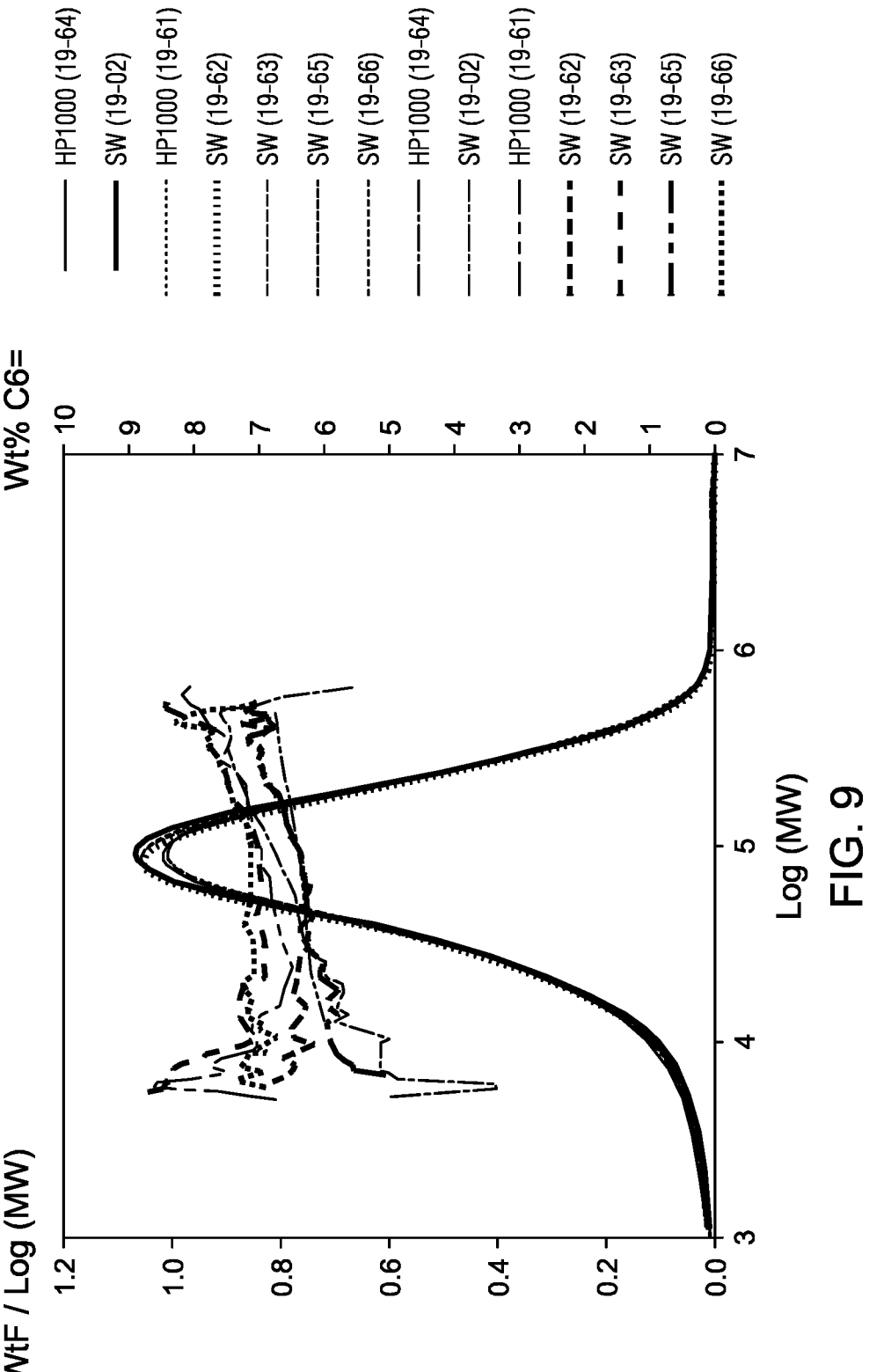
FIG. 9 depicts the CDs from M1 catalyst on different In-Situ sMAO vs. Reference.

The catalyst derived from the in-situ sMAO formed from condition differences and the polymerization condition differences, such as TMA:water ratio, TMA concentration, sMAO formation temperature, gas- vs. slurry- (or super-condensing-) mode polymerization, comonomer to monomer ratio, $H_2$ amount, etc., may also more or less contribute to different CDs as illustrated in FIG. 9, which shows CDs from M1 catalyst on different in-situ sMAO vs. Reference I. The CD of a polymer is closely related to the polymer physical properties and it is highly desired to have a good control on manipulating CDs with a good reproducibility in catalyst preparation for polymer production in a single gas-phase reactor.

Polymerization Test

Example 70: 1-Hexene Polymerization for In-Situ
sMAO Supernate Containing MAO Like Content A polymerization test for 1-hexene using bis(indenyl))
zirconium dichloride (M5) activated with the supernate of
in-situ sMAO from Example 19 was performed. In a 20 mL
vial were charged 0.015 g M5 and one pipette of supernate
from Example 19 and were mixed well. The M5 metallocene
did not show a significant color change, an indication of no
activation. A thermocouple was put into the solution before
0.5 mL pipette of 1-hexene was added. The temperature did
not increase but slightly decreased likely due to iC6 solvent
evaporation to take away heat.

Example 71, Poly Ia and Poly Ib

In the examples above, the term "Poly 1" refers to a lab
scale 2 L salt-bed gas-phase polymerization reactor, in
which a 2 L autoclave reactor was heated to 110° C. and
purged with N₂ for at least 30 minutes. It was charged with
dry NaCl (350 g; Fisher, S271-10 dehydrated at 180° C. and
subjected to pump/purge cycles and finally passed through a
16 mesh screen prior to use) and MAO or TIBAL treated
silica ((5 g) at 105° C.) and stirred for 30 minutes. The
temperature was adjusted to 85° C. At a pressure of 2 psig
N₂, dry and degassed 1-hexene (2.0 mL) was added to the
reactor with a syringe and then the reactor was charged with
N₂ to a pressure of 20 psig. A mixture of H₂ and N₂ was
flowed into the reactor (200 SCCM; 10% H₂ in N₂) while
stirring the bed. Catalysts indicated in the table above were
injected into the reactor with ethylene at a pressure of 220
psig. Ethylene was allowed to flow over the course of the run
to maintain constant pressure in the reactor. 1-hexene was
fed into the reactor as a ratio to ethylene flow 0.1 g/g.
Hydrogen was fed to the reactor at a ratio to ethylene flow
0.5 mg/g. The hydrogen and ethylene ratios were measured
by on-line GC analysis. Polymerizations were halted after 1
hour by venting the reactor, cooling to about 23° C., and
exposing the reactor to air. The salt was removed by washing
with water two times. The polymer was isolated by filtration,
briefly washed with acetone, and dried in air for at least for
two days. Catalyst activities are reported in the table above.
As can be seen, the inventive spray-dried example shows a
catalyst activity greater than double as compared to the
Reference example that was not spray-dried.

The Poly Ia and Poly Ib have difference in the starting
component charges and feeding ratios (Table 21):

TABLE 21

| Poly Ia and Poly Ib component initial charges and feeding ratios | | | | | |
|---|---|---|---|---|---|
| Method | For Catalyst | Initial H₂ (ml) | H₂/C2 Feed ratio | Initial Hexene (ml) | Hexene/C₂ Feed ratio | Cat Charge (mg) |
| Poly Ia | M1, M3 | 85 | 0.25 | 1.5 | 0.06 | 20 |
| Poly Ib | M2 | 120 | 0.5 | 2.5 | 0.1 | 12 |

Example 72, Poly II

The term "Poly II" also refers to a lab scale 2 L slurry
polymerization reactor, in which a 2 L autoclave reactor
under N₂ purge was charged with 0.16 mmol Tri-isobutyl
aluminum (TIBAL) as scavenger of impurities. Sixty ml of
hexene-1 comonomer and 800 ml isobutane diluent were
added. The content of reactor was heated to 80° C. After which 100 mg of silica supported catalyst was introduced
into the reactor with ethylene pressure. Polymerization
started. The total reactor was maintained at 325 psig. Reac-
tor temperature was kept at 85° C. throughout the run. After
40 minutes, reactor was vented and the polymerization was
stopped. Polyethylene resin was collected and dried.

Example 73, Poly III

The term "Poly III" refers to a small gas-phase polymer-
ization pilot unit (R125), in which polymerization was
performed in a 7 foot tall gas-phase fluidized bed reactor
with a 6 inch body and a 10 inch expanded section. Cycle
and feed gases were fed into the reactor body through a
perforated distributor plate, and the reactor was controlled at
300 psi (2,068 kPa) and 70 mol % ethylene. Reactor
temperature was maintained by heating the cycle gas. Sup-
ported catalyst was fed as a 10 wt % slurry in Sono Jell™
from Sonneborn (Parsippany, N.J.). The slurry was thinned
and delivered to the reactor by nitrogen and isopentane feeds
in the catalyst probe. Products were collected from the
reactor as necessary to maintain the desired bed weight.

Example 74, Poly IV

The term "Poly IV" refers to a larger gas-phase polym-
erization unit (R122), in which polymerization was per-
formed in a 22 foot tall gas-phase fluidized bed reactor with
a 13 inch straight section inner diameter and a wider conical
expanded section above. Cycle and feed gases were fed into
the reactor body through a perforated distributor plate, and
the reactor was controlled at 290 psig and 64 mol %
ethylene. The reactor temperature was controlled by
manipulating the temperature of the cycle gas loop. Catalyst
was fed to the reactor as a dry powder with N₂ carrier gas.
Alternatively, catalyst can be fed as a slurry in oil with
isopentane and nitrogen carrier flows to provide adequate
dispersion in the reactor bed. Continuity additive (e.g.,
CA-300 from Univation) was co-fed into the reactor by a
second carrier nozzle to reactor bed, and the feed rate of
continuity additive was adjusted to maintain a weight con-
centration in the bed of between 20 ppm and 40 ppm.
Polymer comonomer composition was controlled by adjust-
ment of the mass feed ratio of comonomer to ethylene, and
MW of the polymer was controlled by adjustment of hydro-
gen concentration.

Example 75, Poly V

The term "Poly V" refers to a lab scale 2 L slurry
polymerization reactor for homo-PP, in which the reactor
was heated at 107° C. with slow N₂ purge for at least 2 hours
before use. To the reactor was charged 1,000 mL propylene
and 2-3 mL 3 wt % TIBAL hexane solution as the scavenger
and allows to agitate for 5 minutes. A desired amount of the
supported catalyst, mixed with mineral oil to form a 5 wt %
slurry, was introduced to the reactor through 250 mL C₃
push-in with high pressure N₂, at ambient. After allowing
another 5 minutes agitation, the reactor temperature was increased to 70° C., a desired amount of H$_2$ was added with a desired amount controlled by pressure difference after pressuring in the high pressure H$_2$ in a 150 mL bomb at ambient temperature to the reactor. The reaction was allowed to go for a desired length of time. The reactor temperature was then reduced to ambient and the volatiles in the reactor were vented. And then the polymer obtained was dried under N$_2$ flow overnight.

Example 76, Poly VI

The term "Poly VI" refers to a lab scale 2 L slurry-gas-phase polymerization for PP-EPR copolymer (ICP), in which a two stage, sequential polymerization is carried in one 2 L reactor. The 1st stage is a homo-PP polymerization similar to Poly V. The 2nd stage involves the venting of the propylene pressure very slowly to reach a desired pressure, e.g., 150 psi while maintain the reactor at between 60-70° C. After the temperature stabilizes at 70° C., a desired ethylene partial pressure, e.g., 180 psi, by adjusting the total ethylene feed pressure equaling to the desired propylene and ethylene pressures, e.g., 150+180=330 psi, is introduced to the reactor continually. After a desired reaction time, the ethylene feed is closed, the reactor temperature is reduced to ambient, and the volatiles are vented to stop the polymerization. The ICP obtained is then dried under N$_2$ flow overnight. The charge of the supported M8 catalyst made from the procedure of A)-4) is 50 mg and the yield of ICP is 174 g, giving an activity of 5,520 g/g cat/hr based on 25 minutes for iPP polymerization w/ 10 psi H$_2$ from the ambient 150 mL bomb and 15 minutes for EPR polymerization. This gives the ICP product total Mw of 214 k (PDI=21.7), iPP phase Mw of 284 k (PDI=5.90), and EPR phase Mw of 68 k (PDI=3.5) from GPC-4D, and EPR about 36 wt % and C$_2$ in EPR about 30 wt% based HPLC-SEC analysis.

Polymer Characterizations

The polymer characterizations reported above where performed using standard procedures and techniques that are well established and known in the art: such as Mw and PDI molecular weight analyses, MI and MIR melt flow rate analyses, polymer density analysis, and resin bulk density analysis, with the exception of the following: High Performance Liquid Chromatography-Size Exclusion Chromatography (HPLC-SEC) Method.

Trichlorobenzene (TCB) purchased from Aldrich reagent grade was filtered through a 0.1 µm Teflon filter before use. The 1-decanol was used as received from Alpha Aesar.

The HPLC-SEC sample was prepared by placing dry polymer in glass vials, then the Polymer Characterization auto-sampler transferred desired amount of 1-decanol and heated the mixture at 160° C. with continuous shaking for about 1.5 hours. All quantities were measured gravimetrically. The injection concentration was from 0.1 to 2.0 mg/mL.

The auto-sampler injected 100 µL of the above prepared sample solution into instrument. The HPLC had a varying gradient composition of mobile phase of 1-decanol and TCB, beginning with 100 vol % of 1-decanol under nominal flow rate of 0.025 mL/min. After sample injection, the mobile phase of HPLC was programmatically adjusted with varying linear gradient changes from 0 vol % TCB/min to 100 vol % TCB/min over certain period of times.

The HPLC gradient profiles used for this analysis over 300 minutes analysis time was 0% of TCB (0 minutes), 30% of TCB (150 minutes), 30% of TCB (170 minutes), 50% of TCB (190 minutes), 100% TCB (200 minutes) and 100% of TCB (300 minutes). A sampling loop collected HPLC eluents and transfers into SEC every 2 minutes. The SEC had 1,2,4,-trichlorobenzene (TCB) as mobile phase with the nominal flow rate of 5 mL/min. The eluents were analyzed with Polymer Characterization IRS detector for mass concentration and chemical composition.

GPC-4D (or GPC-IR) Analysis for Molecular Weight Determination

The distribution and the moments of molecular weight (Mw, Mn, Mw/Mn, etc.) and the comonomer content (C$_2$, C$_3$, C$_6$, etc.) were determined with a high temperature Gel Permeation Chromatography (PolymerChar GPC-IR) equipped with a multiple-channel band filter based infrared detector ensemble IRS, in which a broad-band channel was used to measure the polymer concentration while two narrow-band channels were used for characterizing composition. Three Agilent PLgel 10 µm Mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 µm Teflon filter and degassed with an online degasser before entering the GPC instrument. The nominal flow rate was 1.0 mL/min and the nominal injection volume was 200 µL. The whole system including transfer lines, columns, detectors were contained in an oven maintained at 145° C. Given amount of polymer sample was weighed and sealed in a standard vial with 80 µL flow marker (Heptane) added to it. After loading the vial in the auto-sampler, polymer was automatically dissolved in the instrument with 8 mL added TCB solvent. The polymer was dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration was from 0.2 to 2.0 mg/ml, with lower concentrations used for higher molecular weight samples.

The concentration, c, at each point in the chromatogram was calculated from the baseline-subtracted IRS broadband signal, I, using the following equation:

$$c=\alpha I$$

where α is the mass constant determined with PE or PP standards. The mass recovery was calculated from the ratio of the integrated area of the concentration chromatography over elution volume and the injection mass which is equal to the pre-determined concentration multiplied by injection loop volume.

The molecular weight was determined by combining universal calibration relationship with the column calibration which was performed with a series of monodispersed polystyrene (PS) standards. The MW was calculated at each elution volume with following equation.

$$\log M_X = \frac{\log(K_{PS}/K_X)}{a_X+1} + \frac{a_{PS}+1}{a_X+1}\log M_{PS}$$

where the variables with subscript "X" stand for the test sample while those with subscript "PS" stand for PS. In this method, $\alpha_{ps}$=0.67 and $K_{PS}$=0.000175 while $\alpha_X$ and $K_X$ were obtained from published literature. Specifically, a/K=0.695/0.000579 for PE and 0.705/0.0002288 for PP.

The comonomer composition was determined by the ratio of the IR detector intensity corresponding to $CH_2$ and $CH_3$ channel calibrated with a series of PE and PP homo/copolymer standards whose nominal value were predetermined by NMR or FTIR.

The comonomer composition was determined by the ratio of the IR detector intensity corresponding to $CH_2$ and $CH_3$ channel calibrated with a series of PE and PP homo/copolymer standards whose nominal value were predetermined by NMR or FTIR.

The embodiments provided herein demonstrate the ability to significantly reduce costs for making MAO based supported catalysts, especially if non-calcined silica is in use (by determining absorbed water amount and making up difference of desired amount) to eliminate calcination step and low boiling point solvent is in use such as isopentane or isobutene to significantly reduce drying time vs. drying toluene. The embodiments provided also eliminate the need for cooling facilities, vessels for storing or transporting solution MAO to save energy. The gel formation issues that occur under cooling conditions, which is still changing the solution MAO compositions, is also eliminated to allow better catalyst production and quality control.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, meaning the values take into account experimental error, machine tolerances and other variations that would be expected by a person having ordinary skill in the art.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

Comparative Example 5

This example replicates example 8 of U.S. Pat. No. 5,629,253. In the initial part of that example, 40 g of Grace Davison 948 (G948) support containing 12.5 wt % water (40 g total, 277.5 mmol water or 7.94 mmol/g silica) is added to an initial 7° C. solution of TMA (259.7 mmol) and heptane (245 mL). This comparative example uses a slightly lower level of water in silica (11.8 wt %) and the TMA level was reduced proportionally.

G948 silica was degassed and brought into a drybox. A TGA of the silica revealed the water level to be 4.8 wt % (average of three measurements). Combined with mixing the silica (45.97 g) and water (4.03 g) in a capped bottle then heated at 55° C. for 5 hours then allowed to cool overnight. TGA indicated 11.8 wt % water (average of two measurements). The silica-water was divided into 40 samples of 1+−0.05 g with the total being 40.3 g; the total water amount was 264.1 mmol and the total silanol count was estimated at 71.1 mmol.

Inside the drybox, a 1 L 3-neck flask was equipped with a mechanical stirrer and thermocouple into the solution and cooled in a 7° C. bath. TMA (17.67 g, 245.4 mmol) and heptane (245 mL) were added to the flask and stirred. Obtained $^1H$ NMR of the solution.

After the solution temperature stabilized, the 1 g portions of silica water were added every 2 minutes until 5 g had been added. The reaction was exothermic, the temperature increased to approximately 13° C. Then stirring was stopped and a small sample (~0.1 mL) of the solution removed and analyzed by $^1H$ NMR. While the stirring stopped, the mixture cooled to ~5° C. Then the stirring was continued and the procedure repeated until all the silica-water was added. A total of 8 samples, in addition to the initial sample were taken for $^1H$ NMR. An analysis of the NMR data revealed that 6.92 mmol of TMA is reacted with each gram of silica-water and that all of the TMA was consumed by 35.6 g of silica-water. The average amount of TMA reacted with water OH plus surface SiOH (estimated at 2 mmol/g for this ~300 $m^2/g$ silica) was 0.46±0.04 mmol/mmol. The average amount of TMA reacted with water, ignoring surface silanol, was 1.03±0.09 mmol/mmol. This suggests that the MAO formula formed in this prep is basically the gel MAO, at least as a majority (see FIG. 1).

A solution of (1,3-Me, Bu—Cp)$_2$ZrCl$_2$ (M1, 0.9 g, 2.08 mmol) and heptane (20 mL) were added to the stirred cold slurry. Then the mixture was heated to 74° C. for 1 hour with stirring. Stirring and heating were stopped, then the majority of the solvent was removed blowing N$_2$ onto the surface of the mixture. After a thick but flowable mixture was obtained it was transferred into a fritted column and N$_2$ passed through the frit and dried the material to an easily flowable yellow solid. Yield=48.74 g.

The polymerization test for this comparative example using POLY Ia polymerization procedure gave an activity of 579 g/g cat/hr, comparing to Example 1 in Table 1 for the same metallocene M1 with a much lower MAO loading (based on 5.1 mmol water/g silica) with a formula of Al:O=1.4:1 that gave 4,885 g/g cat/hr activity.

TABLE 22

| | Silica-water (g) | TMA (mmol) | TMA Reacted | Total OH (mmol) | water (mmol) | TMA/(Total OH) (mmol/mmol) | TMA/water (mmol/mmol) |
|---|---|---|---|---|---|---|---|
| Sample | | | | | | | |

<!-- table title spanning -->

TMA Reaction with Silica-Water in Comparative 5.

| Sample | Silica-water (g) | TMA (mmol) | TMA Reacted | Total OH (mmol) | water (mmol) | TMA/(Total OH) (mmol/mmol) | TMA/water (mmol/mmol) |
|---|---|---|---|---|---|---|---|
| 0 | 0 | 245.1 | 0.0 | 0 | 0 | | |
| 1 | 5 | 212.5 | 32.6 | 74.9 | 33 | 0.44 | 0.99 |
| 2 | 10 | 177.1 | 35.5 | 74.9 | 33 | 0.47 | 1.08 |
| 3 | 15 | 145.1 | 32.0 | 74.9 | 33 | 0.43 | 0.97 |
| 4 | 20 | 108.3 | 36.8 | 74.9 | 33 | 0.49 | 1.11 |
| 5 | 25 | 73.2 | 35.2 | 74.9 | 33 | 0.47 | 1.07 |
| 6 | 30 | 35.5 | 37.7 | 74.9 | 33 | 0.50 | 1.14 |
| 7 | 35 | 6.4 | 29.1 | 74.9 | 33 | 0.39 | 0.88 |
| 8 | 40 | 0 | NA | 74.9 | 33 | | |

What is claimed is:

1. A method for forming a supported MAO composition, comprising:

forming a water loaded silica support with a water loading of 3-7 (mmol water/g support) for a silica support having a surface area in the range of 100-300 m$^2$/g or 5-13 mmol water/g support for a silica support having a surface area in the range of 300-800 m$^2$/g, provided that the at least 60% of the pores in the silica support have diameters at least 60 angstroms or larger and the total pore volume is in the range of 0.9-3 mL/g;

treating the water loaded silica support in a closed container in a solid or slurry form for at least 10 minutes at 40 to 100° C. or in either a closed or an open container for at least 30 minutes at 0 to 40° C.;

contacting the water loaded silica support as a solid or as a slurry with a single or multiple aluminumalkyl solution comprising at least 50 mol % TMA based on total Al that is cooled to a temperature in the range of −5 to −60° C., provided that for the water loading of 3-7 mmol/g the temperature is −5° C. or colder and for the water loading higher than 7 mmol/g the temperature is −10° C. or colder and also provided that at least a portion of the supported MAO is formed in an environment of a TMA: water molar ratio at 1:0.75 or higher; and heating the supported MAO at 40-130° C. for at least 1 hour or aging at ambient temperature for at least 24 hours to obtain a formed supported MAO.

2. The method of claim 1 wherein the silica support is un-calcined or calcined with a temperature of 600° C. or lower for derived catalyst systems involving slurry polymerization processes.

3. A catalyst system formed from contacting at least one transition metal catalyst precursor with the formed supported MAO of claim 1.

4. The catalyst system of claim 3, wherein the supported MAO is heated at 70-130° C. for 2-16 hours before contacting one or more transition metal catalyst precursors comprising at least one transition metal with an atomic number>54.

5. The catalyst system of claim 4, wherein the silica support is un-calcined or calcined in the range 100-1,000° C. and wherein the catalyst system further comprises a continuity agent used in either slurry or gas phase polymerization.

6. The catalyst system of claim 4 wherein the one or more transition metal catalyst precursors comprises a lanthanide compound.

7. The catalyst system of claim 4 wherein the one or more transition metal catalyst precursors comprises a compound selected from the group consisting of a hafnium compound, a tantalum compound, a tungsten compound, and combinations thereof.

* * * * *